(12) United States Patent
Birnbach

(10) Patent No.: US 9,036,765 B2
(45) Date of Patent: May 19, 2015

(54) METHOD AND SYSTEM FOR INERTIAL CONFINEMENT FUSION REACTIONS

(75) Inventor: Curtis Birnbach, New Rochelle, NY (US)

(73) Assignee: Advanced Fusion Systems LLC, Newtown, CT (US)

( * ) Notice: Subject to any disclaimer, the term of this patent is extended or adjusted under 35 U.S.C. 154(b) by 674 days.

(21) Appl. No.: 11/754,928

(22) Filed: May 29, 2007

(65) Prior Publication Data

US 2008/0063132 A1   Mar. 13, 2008

Related U.S. Application Data

(60) Provisional application No. 60/809,453, filed on May 30, 2006.

(51) Int. Cl.
  *G21B 1/00*      (2006.01)
  *H01F 38/00*     (2006.01)
  (Continued)

(52) U.S. Cl.
  CPC  *H01F 38/00* (2013.01); *G21B 1/03* (2013.01); *G21B 1/23* (2013.01); *G21D 7/00* (2013.01); *Y02E 30/14* (2013.01); *G21B 1/00* (2013.01)

(58) Field of Classification Search
  CPC ....................................................... G21B 1/03
  USPC ......... 376/103, 102, 105, 106, 122, 123, 144, 376/146, 147, 149; 378/121, 122, 136
  See application file for complete search history.

(56) References Cited

U.S. PATENT DOCUMENTS

| | | | | |
|---|---|---|---|---|
| 3,489,645 A | * | 1/1970 | Daiber | 376/103 |
| 3,663,360 A | * | 5/1972 | Post | 376/147 |

(Continued)

FOREIGN PATENT DOCUMENTS

| | | |
|---|---|---|
| GB | 1207698 A | 10/1970 |
| GB | 1481848 A | 8/1977 |

(Continued)

OTHER PUBLICATIONS

Cuneo et al., "Optimal X-Ray Pulse Compression with Compact Nested Wire Arrays on Z*", in Plasma Science, 2007, ICOPS 2007, IEEE 34th International Conference on-. Publication Date: Jun. 17-22, 2007. INSPEC Accession No. 9784584.*

(Continued)

*Primary Examiner* — Jack W Keith
*Assistant Examiner* — Daniel Wasil
(74) *Attorney, Agent, or Firm* — Bruzga & Associates; Charles E. Bruzga; Jay S. Pattumudi

(57) ABSTRACT

Disclosed is a system for extracting energy from inertial confinement fusion reactions, which includes a central target chamber for receiving fusion target material. A plurality of energy drivers are arranged around the target chamber so as to supply energy to fusion target material in the chamber to initiate an inertial confinement fusion reaction of the material, releasing energy in the forms of fusion plasma and heat. A plurality of structures for extracting energy from the fusion reaction are provided, and comprise devices to extract high voltage DC energy from the fusion plasma, and means to extract thermal energy from the central target chamber. Power to the energy drivers may be supplied from high voltage DC energy extracted from the fusion reactions. The energy drivers may use an apodizing filter to impart a desired shape to the wavefront of the driving energy for causing the fusion reactions, to avoid hydrodynamic instabilities.

21 Claims, 17 Drawing Sheets

(51) Int. Cl.
*G21B 1/03* (2006.01)
*G21B 1/23* (2006.01)
*G21D 7/00* (2006.01)

(56) References Cited

U.S. PATENT DOCUMENTS

| | | | |
|---|---|---|---|
| 3,816,771 A * | 6/1974 | Moir | 310/308 |
| 3,892,970 A | 7/1975 | Freeman et al. | |
| 4,010,396 A | 3/1977 | Ress et al. | |
| 4,057,462 A * | 11/1977 | Jassby et al. | 376/107 |
| 4,058,486 A * | 11/1977 | Mallozzi et al. | 376/103 |
| 4,202,725 A | 5/1980 | Jarnagin | |
| 4,205,278 A * | 5/1980 | George et al. | 372/57 |
| 4,229,708 A * | 10/1980 | Mani et al. | 372/5 |
| 4,244,782 A | 1/1981 | Dow | |
| 4,267,488 A | 5/1981 | Wells | |
| 4,280,048 A * | 7/1981 | Smith | 376/111 |
| 4,314,879 A | 2/1982 | Hartman et al. | |
| 4,347,621 A | 8/1982 | Dow | |
| 4,363,775 A | 12/1982 | Bussard et al. | |
| 4,367,193 A | 1/1983 | Bussard | |
| 4,370,295 A | 1/1983 | Bussard | |
| 4,370,296 A | 1/1983 | Bussard | |
| 4,392,111 A | 7/1983 | Rostoker | |
| 4,397,810 A | 8/1983 | Salisbury | |
| 4,434,130 A | 2/1984 | Salisbury | |
| 4,548,782 A | 10/1985 | Manheimer et al. | |
| 4,560,528 A | 12/1985 | Ohkawa | |
| 4,592,056 A * | 5/1986 | Elton | 372/5 |
| 4,597,933 A * | 7/1986 | Ripin et al. | 376/143 |
| 4,601,871 A | 7/1986 | Turner | |
| 4,618,470 A | 10/1986 | Salisbury | |
| 4,639,348 A | 1/1987 | Jarnagin | |
| 4,650,631 A | 3/1987 | Knorr | |
| 4,723,263 A * | 2/1988 | Birnbach et al. | 378/122 |
| 4,731,786 A | 3/1988 | MacGowan et al. | |
| 4,735,762 A * | 4/1988 | Lasche | 376/102 |
| 4,825,646 A | 5/1989 | Challoner et al. | |
| 4,835,787 A * | 5/1989 | Pappas | 376/146 |
| 4,836,972 A | 6/1989 | Bussard et al. | |
| 4,853,173 A | 8/1989 | Stenbacka | |
| 4,859,399 A | 8/1989 | Bussard | |
| 4,894,199 A | 1/1990 | Rostoker | |
| 4,904,441 A | 2/1990 | Sorensen et al. | |
| 4,961,195 A * | 10/1990 | Skupsky et al. | 372/31 |
| 5,015,432 A | 5/1991 | Koloc | |
| 5,019,321 A | 5/1991 | Bussard | |
| 5,041,760 A | 8/1991 | Koloc | |
| 5,049,350 A | 9/1991 | Bussard et al. | |
| 5,103,452 A * | 4/1992 | London et al. | 372/5 |
| 5,152,955 A | 10/1992 | Russell | |
| 5,160,694 A | 11/1992 | Steudtner | |
| 5,160,695 A | 11/1992 | Bussard | |
| 5,174,945 A | 12/1992 | Bussard et al. | |
| 5,202,932 A * | 4/1993 | Cambier et al. | 382/142 |
| 5,404,364 A * | 4/1995 | Kepros | 372/5 |
| 5,768,339 A | 6/1998 | O'Hara | |
| 5,923,716 A | 7/1999 | Meacham | |
| 6,188,746 B1 | 2/2001 | Miley et al. | |
| 6,189,484 B1 * | 2/2001 | Yin et al. | 118/723 I |
| 6,229,876 B1 | 5/2001 | Enck et al. | |
| 6,259,763 B1 * | 7/2001 | Bitter et al. | 378/82 |
| 6,396,213 B1 | 5/2002 | Koloc | |
| 6,496,563 B1 * | 12/2002 | Bacon | 378/101 |
| 6,526,086 B1 | 2/2003 | Wakabayashi et al. | |
| 6,611,106 B2 | 8/2003 | Monkhorst et al. | |
| 6,628,740 B2 | 9/2003 | Monkhorst et al. | |
| 6,664,740 B2 | 12/2003 | Rostoker et al. | |
| 6,680,480 B2 | 1/2004 | Schoen | |
| 6,718,012 B2 * | 4/2004 | Ein-Gal | 378/121 |
| 6,850,011 B2 | 2/2005 | Monkhorst et al. | |
| 6,852,942 B2 | 2/2005 | Monkhorst et al. | |
| 6,888,907 B2 | 5/2005 | Monkhorst et al. | |
| 6,891,911 B2 | 5/2005 | Rostoker et al. | |
| 6,894,446 B2 | 5/2005 | Monkhorst et al. | |
| 6,995,515 B2 | 2/2006 | Rostoker et al. | |
| 7,002,148 B2 | 2/2006 | Monkhorst et al. | |
| 7,015,646 B2 | 3/2006 | Rostoker et al. | |
| 7,026,763 B2 | 4/2006 | Rostoker et al. | |
| 7,119,491 B2 | 10/2006 | Rostoker et al. | |
| 7,126,284 B2 | 10/2006 | Rostoker et al. | |
| 7,129,656 B2 | 10/2006 | Rostoker et al. | |
| 7,180,242 B2 | 2/2007 | Rostoker et al. | |
| 7,232,985 B2 | 6/2007 | Monkhorst et al. | |
| 7,391,160 B2 | 6/2008 | Monkhorst et al. | |
| 7,439,678 B2 | 10/2008 | Rostoker et al. | |
| 7,459,654 B2 | 12/2008 | Monkhorst et al. | |
| 7,477,718 B2 | 1/2009 | Rostoker et al. | |
| 2002/0168049 A1 | 11/2002 | Schriever et al. | |
| 2003/0002610 A1 * | 1/2003 | Panarella | 376/100 |
| 2004/0095705 A1 * | 5/2004 | Mills et al. | 361/230 |
| 2005/0084054 A1 | 4/2005 | Franz | |
| 2005/0200256 A1 | 9/2005 | Adamenko | |
| 2007/0201598 A1 | 8/2007 | Lerner et al. | |

FOREIGN PATENT DOCUMENTS

| | | |
|---|---|---|
| JP | 53143894 A | 12/1978 |
| JP | 59-12544 A | 1/1984 |
| RU | 2006128695 A | 8/2006 |
| SU | 953967 A | 7/1980 |
| WO | 01/39197 A2 | 5/2001 |

OTHER PUBLICATIONS

Linford et al., "A Review of the U.S. Department of Energy's Inertial Fusion Energy Program", Journal of Fusion Energy 22(2), 93-107 (Jun. 2003).*

McCrory et al., "Progress in direct-drive inertial confinement fusion", Physics of Plasmas 15, 055503 (2008).*

Roth, M., "Review of the current status and prospects of fast ignition in fusion targets driven by intense, laser generated proton beams", Plasma Physics and Controlled Fusion 51, 014004 (7 pages) (2009).*

Kadau et al., "The importance of fluctuations in fluid mixing", Proceedings of the National Academy of Science of the United States of America, May 8, 2007, vol. 104, issue 19, pp. 7741-'5.*

Chiravalle, V.P., "The k-L-turbulence for describing buoyancy-driven fluid instabilities", in "Laser and Particle Beams", vol. 24, pp. 381-394 (2006).*

Seife, Ch., "Sun in a Bottle—The Starnge History of Fusion and the Science of Wishful Thinking", Viking (published by the Penguin Group), 2008, Chapter 5.("Heat and Light"), pp. 102-126.*

Hu et al., "Strong Coupling and Degeneracy Effects in Inertial Confinement Fusion Implosions", Physical Review Letters 104, 235003 (2010) (4 pages).*

Donko et al., "Caging of Particles in One-Component Plasmas", Physical Review Letters 88 (22), 225001 (2002) (4 pages).*

McCrory et al., "Direct-drive inertial confinement fusion research at the Laboratory for Laser Energetics: charting the path to thermonuclear ignition", Nuclear Fusion 45 (2005), S283-290 (publ.: IOP and IAEA).*

Hu et al., "Strong Coupling and Degeneracy Effects in Inertial Confinement Fusion Implosions", Physical Review Letters 104, 235003 (2010) (4 pages). Already in electronic file.*

Donko et al., "Caging of Particles in One-Component Plasmas", Physical Review Letters vol. 88, No. 22 (Jun. 3, 2002). Already in electronic file.*

Nuckolls et al., "Laser Compression of Matter to Super-High Densities: Themronuclear (CTR) Applications", Nature vol. 239 Sep. 15, 1972.*

Bodner, S.E., "Rayleigh-Taylor Instability and Laser-Pellet Fusion", Physical Review Letters 33(13), Sep. 23, 1974, pp. 761-764.*

Betti et al, "Bubble Acceleration in the Ablative Rayleigh-Taylor Instability", Physical Review Letters 97, 205002 (4 pp.) Nov. 17, 2006.*

Rostoker, N., "Fluctuations of a Plasma", Nuclear Fusion 1, pp. 101-120 (1961).*

Cap, F., Preface to "Handbook of Plasma Instabilities", ISBN: 978-0-12-159101-4 (Elsevier 1976).*

(56) References Cited

OTHER PUBLICATIONS

Energy and Technology Review, "The Nova laser fusion facility", Dec. 1980.*

International Search Report and Written Opinion of the International Searching Authority, issued on Apr. 9, 2008 in PCT Application PCT/US2007/69972 filed on May 30, 2007.

Don Steiner, "A Brief History of Fusion Power Plants," RPI Symposium on Fusion Power Plants, MIT, Jan. 22, 2001.

M.W. Binderbauer et al, "Turbulent Transport in Magnetic Confinement: How to Avoid It," J. Plasma Physics, Apr. 8, 1996, pp. 451-465, vol. 56 part 3, Cambridge University Press.

N. Rostoker et al, "Magnetic Fusion with High Energy Self-Colliding Ion Beams," Physics Review Letters: American Physical Society, Mar. 22, 1993, pp. 1818-1821; vol. 70, No. 12.

N. Rostoker et al, "Colliding Beam Fusion Reactors," Journal of Fusion Energy, vol. 22, No. 2, Jun. 2003, pp. 83-92, Plenum Publishing Corporation.

Members of the LASL CTR Staff, "Controlled Thermonuclear Research at LASL: Present. Status and Future Plans for Feasibility and Reactor Experiments" Jun. 1971, Los Alamos, NM.

G.A. Wurden et al, "Progress on the FRX-L FRC Plasma Injector at LANL. For Magnetized Target Fusion," Los Alamos National Laboratory, LA-UR-01-5301 Sep. 25, 2001, Los Alamos, NM.

G.J. Hartwell, et al. "Design and Construction Progress of the Compact Toroidal Hybrid," The 13th International Stellarator Workshop, Paper No. PIIB.7.

E. J. Lerner, "Towards advanced-fuel fusion: Electron, ion energy > 100keV in a dense plasma," Lawrenceville Plasma Physics, 9 Tower Place, Lawrenceville, NJ 08648.

M. Ragheb, "Magnetic Confinement Fusion," Apr. 30, 2006, Univeristy of Illinois at Urbana-Champaign.

J. Spaleta, et al, "CDX-U Equilibrium Reconstructions," PPPL PS&T Seminar, Jan. 27, 2006.

"An Assessment of the Department of Energy's Office of Fusion Energy Sciences Program Fusion Science" Fusion Science Assessment Committee, etc. ISBN: 0-309-50269-1, 116 pages.

S.P. Regan et al., "Dependence of Shell Mix on Feedthrough in Direct Drive Inertial Confinement Fusion," Physics Review Letters, May 7, 2004, vol. 92 No. 18, American Phys Societ.

M.D. Rosen, "The physics issues that determine inertial confinement fusion target gain and driver requirements: A tutorial," Physics of Plasmas, May 1999, vol. 6, No. 5.

B A. Remington et al., "Hydrodynamic Instability Experiments on the NOVA Laser," Aug. 20, 1996, 16th Annual IAEA Conference on Plasma Physics, etc., Oct. 7, 96, Montreal, Canada.

A.V. Hamza, "Inertial Confinement Fusion Materials Science," Encyclopedia of Materials: Science and Technology. UCRL-JRNL-204455, Lawrence Livermore National Laboratory.

M. Nakai et al. "Fundamental Experiments on Hydrodynamic Instability in Direct-Drive Laser Fusion at Gekko XII".

M. Gai, "Production of Fast Neutrons with a Plasma Focus Device," Laboratory for Nuclear Science at Avery Point, University of Connecticut, May 5, 2006.

R.W. Moir et al, "Direct Energy Conversion in Fusion Reactors," Energy Technology Handbook, 1977, pp. 5-150-5-154, Lawrence Livermore Laboratories, Livermore, CA.

Y.C. F. Thio. "Magneto-inertial fusion: An emerging concept for inertial fusion and dense plasmas in ultrahigh magnetic fields," Office of Fusion Energy Sciences (U.S. DOE).

S. Atzeni, et al. The Physics of Inertial Fusion, Beam Plasma Interaction, Hydrodynamics, Hot Dense Matter, Chapter 1: Nuclear Fusion Reactions, p. 11, Table 1.1, Oxford.

The X-Ray Laser: From Underground to Tabletop, from https://www.llnl.gov/str/Dunn.html visited on Dec. 14, 2009.

S.J. Smith, et al. Visible Light from Localized Surface Charges Moving across a Grating, Letters to the Editor, Lyman Laboratory. Harvard Univ., Cambridge, MA (Sep. 25, 1953).

S. Haan, "On target Desinging for Ignition," Lawrence Livermore National Laboratory, Sicence & Technology Review, Jul./Aug. 1999. [[NOTE: This document was previously submitted. See 8-page document filed on Feb. 4, 2010.]].

Ahieser, A.I., "Plasma Electrodynamics," contributor, "Nauka," pp. 546-561, 1974.

Basco, M.M., Basic Physics of Inertial Confinement Fusion Reaction, pp. 6-9, 2009.

Prokhorov, A.M., Physical Encyclopedia, vol. 1, pp. 176-180, 227-228, 267-269, 1988.

"Nuclear Fusion", Wikipedia, <http://en.wikipedia.org/wiki/Nuclear_fusion> (last visited Jun. 22, 2012).

Bishop, B., NIF Experiments Show Initial Gain in Fusion Fuel, Lawrence Livermore National Laboratory (Feb. 6, 2014), https://www.llnl.gov/news/aroundthelab/2014/Feb/NR-14-02-06.html#.UwVwNs6GfRG.

* cited by examiner

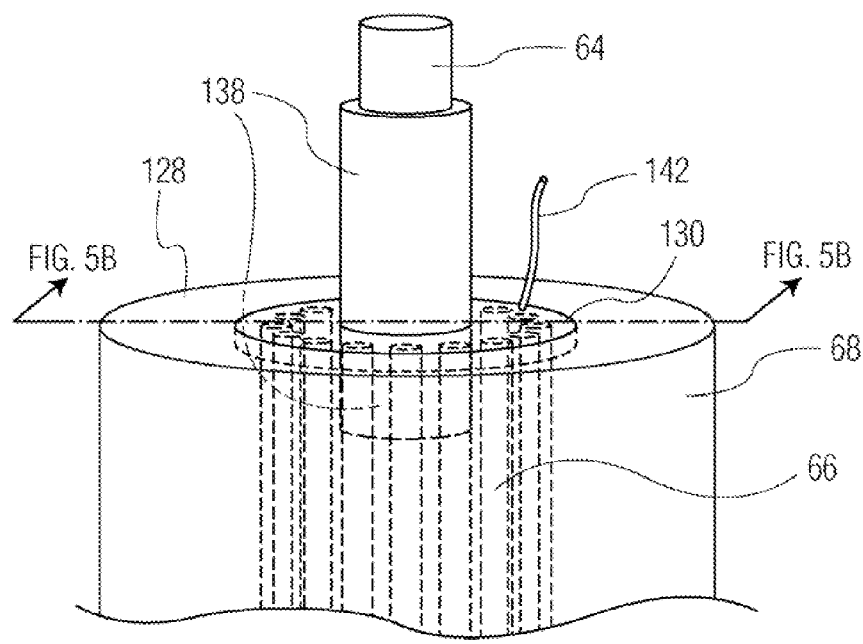
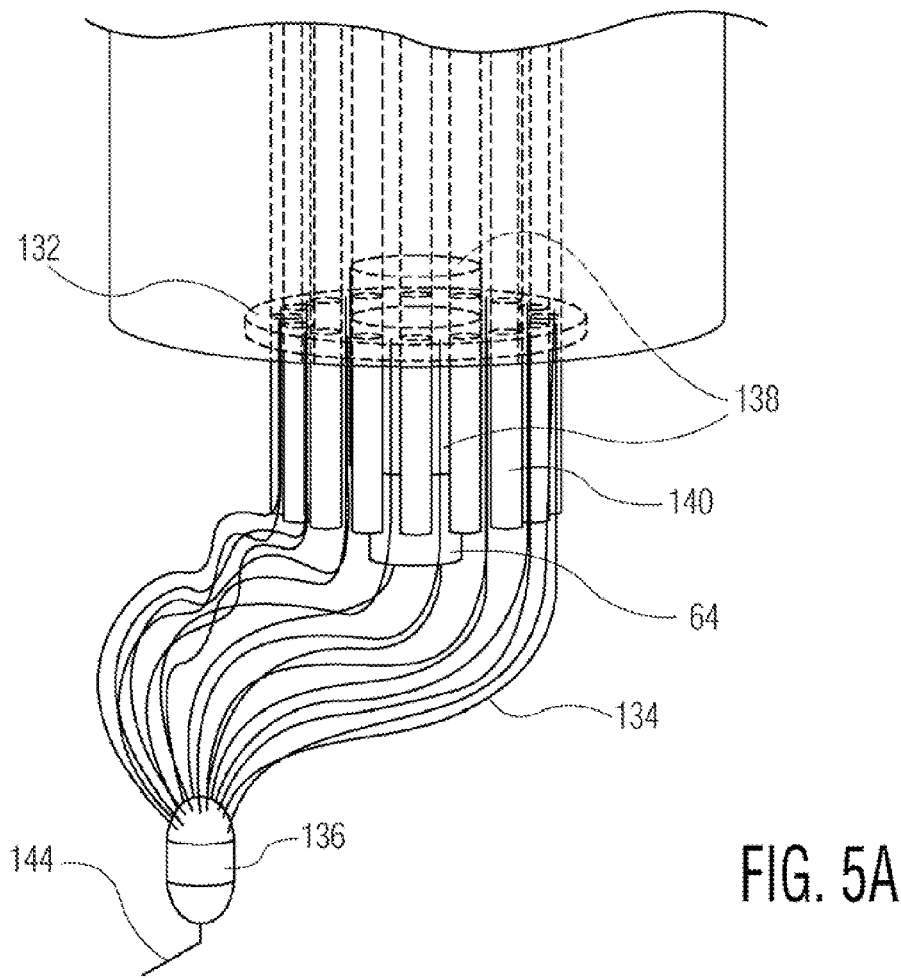
FIG. 5A

METHOD AND SYSTEM FOR INERTIAL CONFINEMENT FUSION REACTIONS

PRIORITY APPLICATION

This application claims priority from U.S. Provisional Patent Application No. 60/809,453 entitled "Method & Apparatus for Controlled Fusion Reactions" filed May 30, 2006. The foregoing application is incorporated herein by reference in its entirety.

FIELD OF THE INVENTION

The present invention relates to methods and systems for extracting energy from controlled fusion reactions.

BACKGROUND OF THE INVENTION

It is widely recognized that controlled fusion offers a clean and plentiful energy source. However, despite billions of dollars invested, only limited success has been achieved in creating an efficient, self-sustaining fusion reaction. All prior approaches have been limited by three major factors:

(a) Only a single means of energy extraction is used.
(b) Instead of focusing on Direct Drive X-ray driven reactions, the bulk of the work has been focused on indirect drive reactions, particularly using large lasers as drivers.
(c) Hydrodynamic instability is a serious problem. This occurs when the compression of the target pellet is not sufficiently uniform. It gives rise to local thermal non-uniformity which, in turn, causes local cooling. This results in an unsymmetrical burn of the fuel.

Energy can be extracted from a fusion reaction by two primary means: Thermal and Electrical. Thermal extraction is a straightforward application of the Rankine Thermal Cycle, which is used in almost every electrical power plant. In this process, a coolant is heated, the heated coolant used to turn a turbine, and the turbine used to turn a generator. This process has a nominal 55% efficiency.

It is both possible and practical to extract electricity directly from fusion plasma. This has been demonstrated many times, and is a process with an efficiency of about 85%. The disadvantage of this technique to prior art fusion power systems is that it produces high voltage DC. High voltage DC is difficult to work with and, more importantly, not suitable for long distance power transmission and distribution. It cannot be readily or efficiently shifted in voltage as AC power can.

Hydrodynamic Instability is a major problem that the designer of every fusion power system faces. Formally known as Rayleigh-Taylor Instability, it is a problem that arises from non-uniform compression of the fuel pellet. Non-uniformities in excess of 1% in compression result in the formation of "jets" of energy that surge outward and locally cool the target pellet. The current generation of laser driven fusion systems use multiple beams (as many as 192 in one system) to attempt to provide a sufficiently uniform compression of the fuel pellet.

It would be desirable to provide a system for extracting energy from controlled fusion reactions in which both thermal energy and high voltage DC energy are extracted.

It would be desirable if extracted high voltage DC energy can be used as an energy source to sustain controlled fusion reactions.

It would be further desirable to design a system from extracting energy form controlled fusion reactions, with a high hydrodynamic stability for achieving highly uniform compression of fuel pellets.

SUMMARY OF THE INVENTION

One embodiment of the invention provides a system for extracting energy from controlled fusion reactions. The system includes a central target chamber for receiving fusion target material. A plurality of energy drivers are arranged around the target chamber so as to supply energy to fusion target material in the chamber to initiate a controlled fusion reaction of the material, releasing energy in the forms of fusion plasma and heat. A plurality of means for extracting energy from the fusion reaction are provided, and comprise means to extract high voltage DC power from the fusion plasma; and means to extract thermal energy from the central target chamber.

The foregoing embodiment increases efficiency of a fusion power system by extracting both high voltage DC energy and thermal energy.

Another embodiment of the invention provides a system for extracting energy from controlled fusion reactions wherein the plurality of energy drivers are powered by an energy storage means. The energy storage means receives power from a first power supply and provides start-up and make-up power, and a second power supply derives energy from high voltage DC power extracted from the fusion plasma. The "start-up power" is the total energy required for initiate the fusion reaction and the "make-up power" is the energy that is added to the energy from the second power supply to maintain operation of the fusion reaction.

The foregoing embodiment achieves high efficiency by using the high voltage DC power extracted from the fusion reaction as a source of power for the energy drivers that drive the fusion reactions. This means that most of the energy required to drive the fusion reaction is derived from the (previous) fusion reaction itself.

A further embodiment of the invention provides a system for extracting energy from controlled fusion reactions in which each of the plurality of energy drivers comprises a unitary apparatus. The unitary apparatus produces both (a) an x-ray pulse for causing the fusion target material to undergo a controlled fusion reaction so as to cause energy release in the forms of fusion plasma and heat, and (b) RF energy to simultaneously heat the fusion target material.

The foregoing embodiment of the invention has the ability to produce an RF heating pulse simultaneously with the x-ray drive pulse without reducing efficiency. This allows the use of RF heating to increase the efficiency of the fusion power system at little additional cost and with no energy penalty.

A still further embodiment of the invention provides a fusion power system in which an apodizing structure is associated with each energy driver for reshaping the wavefront of the x-ray pulse to be concave from the perspective of the fusion target material.

The foregoing embodiment of the invention corrects the wavefront errors that give rise to Rayleigh-Taylor Hydrodynamic instability by means of the mentioned Apodizing Filter. As the target pellet is a sphere, the Apodizing filter is used to change the shape of the compression wavefront to a highly concave surface whose radius matches the radius of the target By this means, the wavefront "wraps around" one face of the target and provides totally uniform compression of the target.

A direct benefit of the use of Apodizing Filters to correct the compression wavefront is that the number of beams used to illuminate the target is reduced. Instead of the 192 beams that the National Ignition Facility Fusion Reactor at Lawrence Livermore lab in California uses, the current embodiment of the invention may allow the use of as far fewer beams, such as 6. This directly reduces the cost and size of the reactor, while increasing its reliability.

DESCRIPTION OF THE DRAWINGS

FIG. 5A is a perspective view of Grid and Phase Matching Network used with the SXE of FIGS. 4A and 4B.

DETAILED DESCRIPTION OF THE INVENTION

A list of drawing reference numbers, their associated parts and preferred materials for the parts can be found near the end of this description of the preferred embodiments. Literature references are cited in full after the list of drawing reference numbers. In this description, short literature references for author "Nakai," for instance, are given as follows: (Nakai Reference.)

Main Principles of Preferred Embodiments

Main principles of preferred embodiments of the invention are described in connection with FIGS. 1-3.

Figure 1:
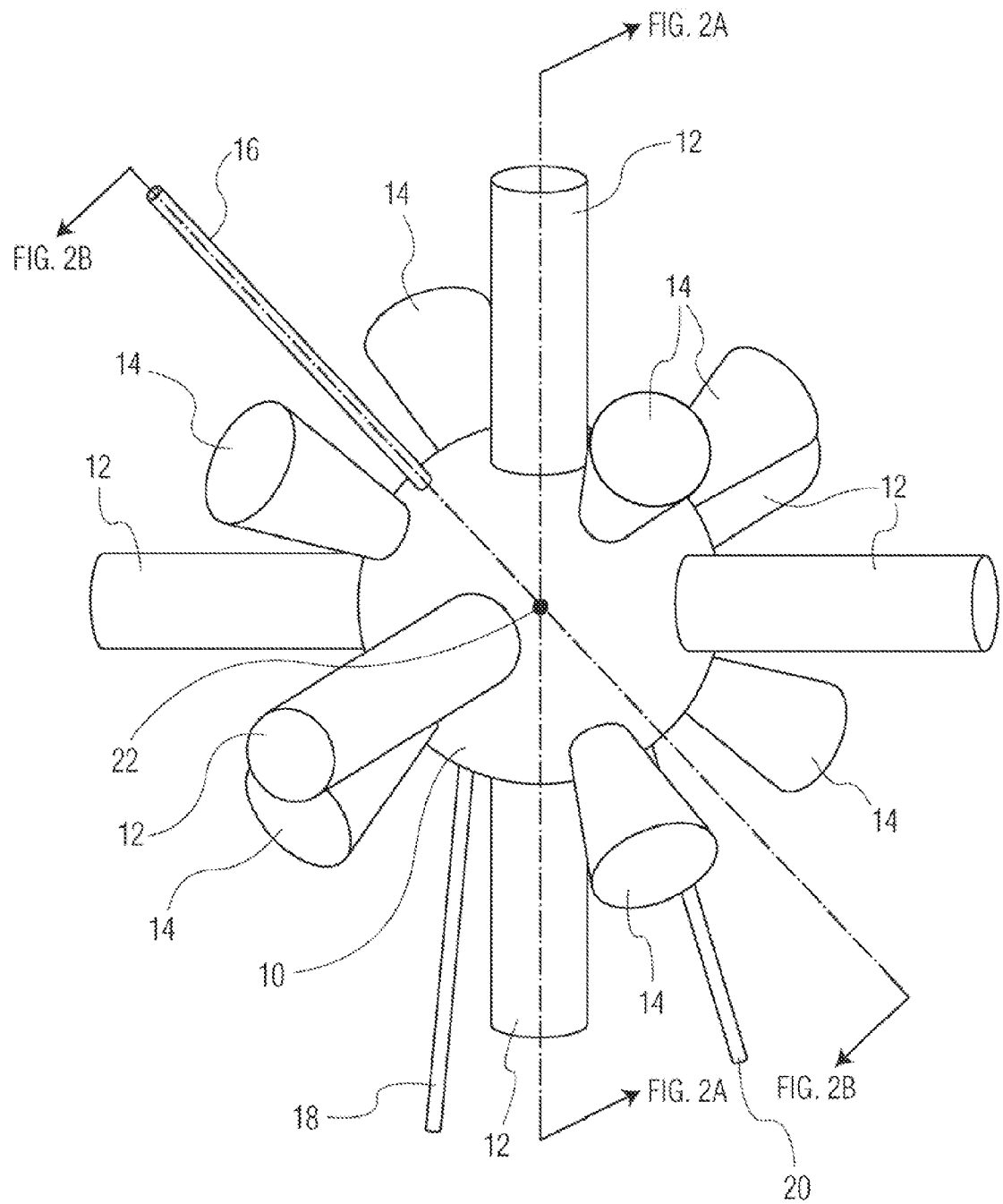
FIG. 1 is a simplified, perspective view of a reactor for generation of energy by controlled nuclear fusion.

FIG. 1 shows a reactor for generation of energy by controlled nuclear fusion. The system includes of a central target chamber or region 10. A series six or more of Energy Drivers 12 are arranged in symmetrical pairs around the central target region. The symmetrical Energy Drivers 12 are arranged in symmetrical manner about a target pellet location 22, so as to collectively create a preferably highly spherical wavefront that impinges on target fusion pellet at location 22. The energy drivers produce X-ray beams at high fluency which symmetrically compress the target to initiate and sustain a fusion reaction. The energy drivers are preferably Stimulated X-ray Emitters (SXE) as first described by the inventor of this current invention in U.S. Pat. No. 4,723,263. In the preferred embodiment, the mentioned SXE drivers are fitted with an RF producing means which provides a simultaneous pulse of RF energy to provide additional heat to the reaction. This is described further in the discussion of FIGS. 10-13.

Figure 2A:
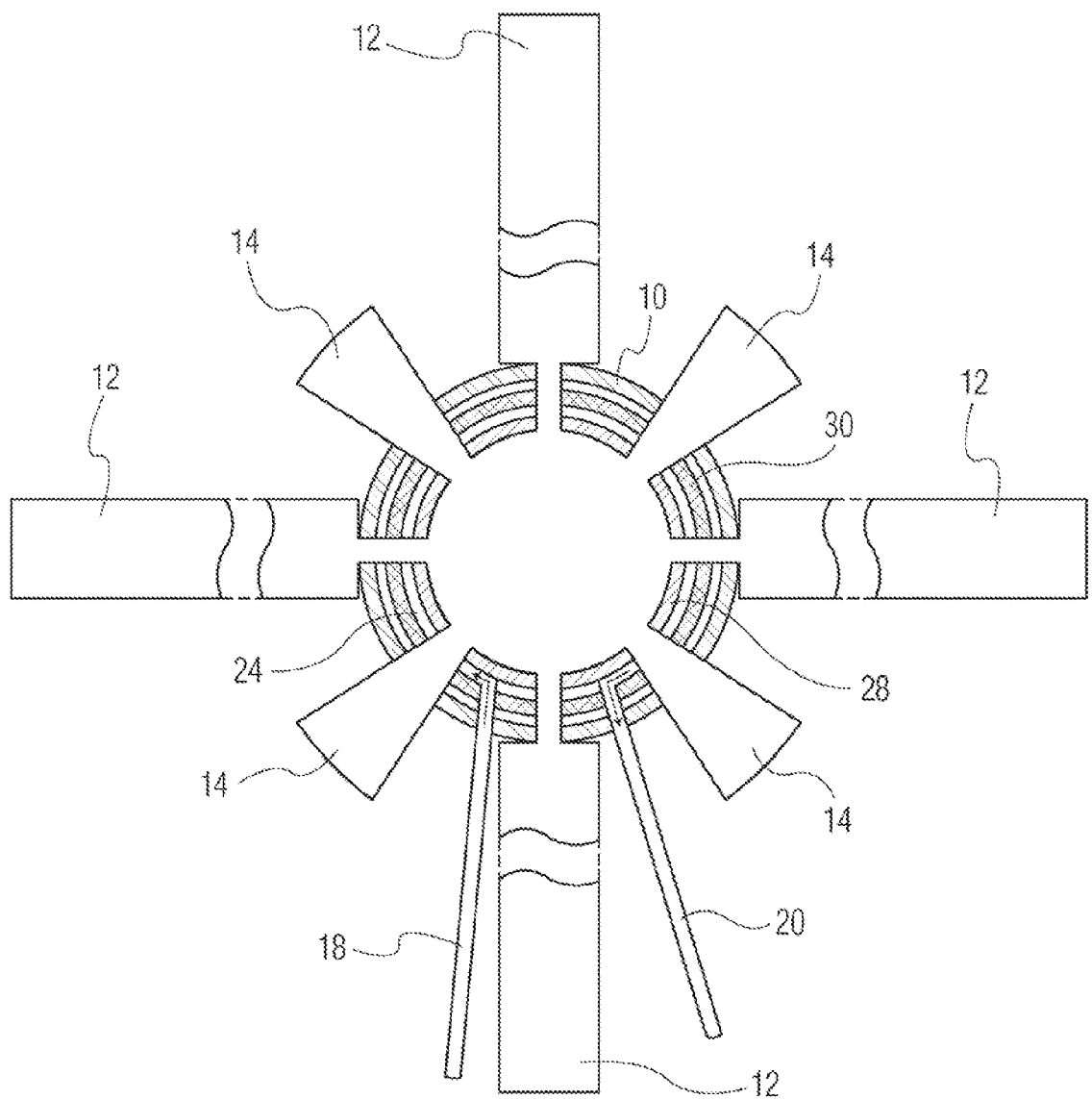
FIGS. 2A and 2B are cross sectional view of the reactor of FIG. 1, with FIG. 2A showing the section indicated as "FIG. 2A-FIG. 2A" in FIG. 1, and FIG. 2B showing the section indicated as "FIG. 2B-FIG. 2B" in FIG. 1.
Figure 2B:
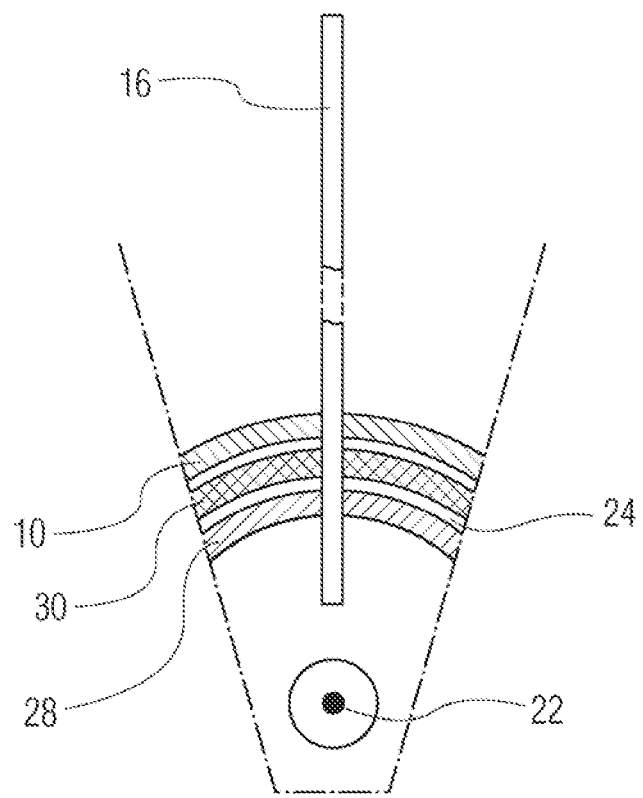
Figure 3:
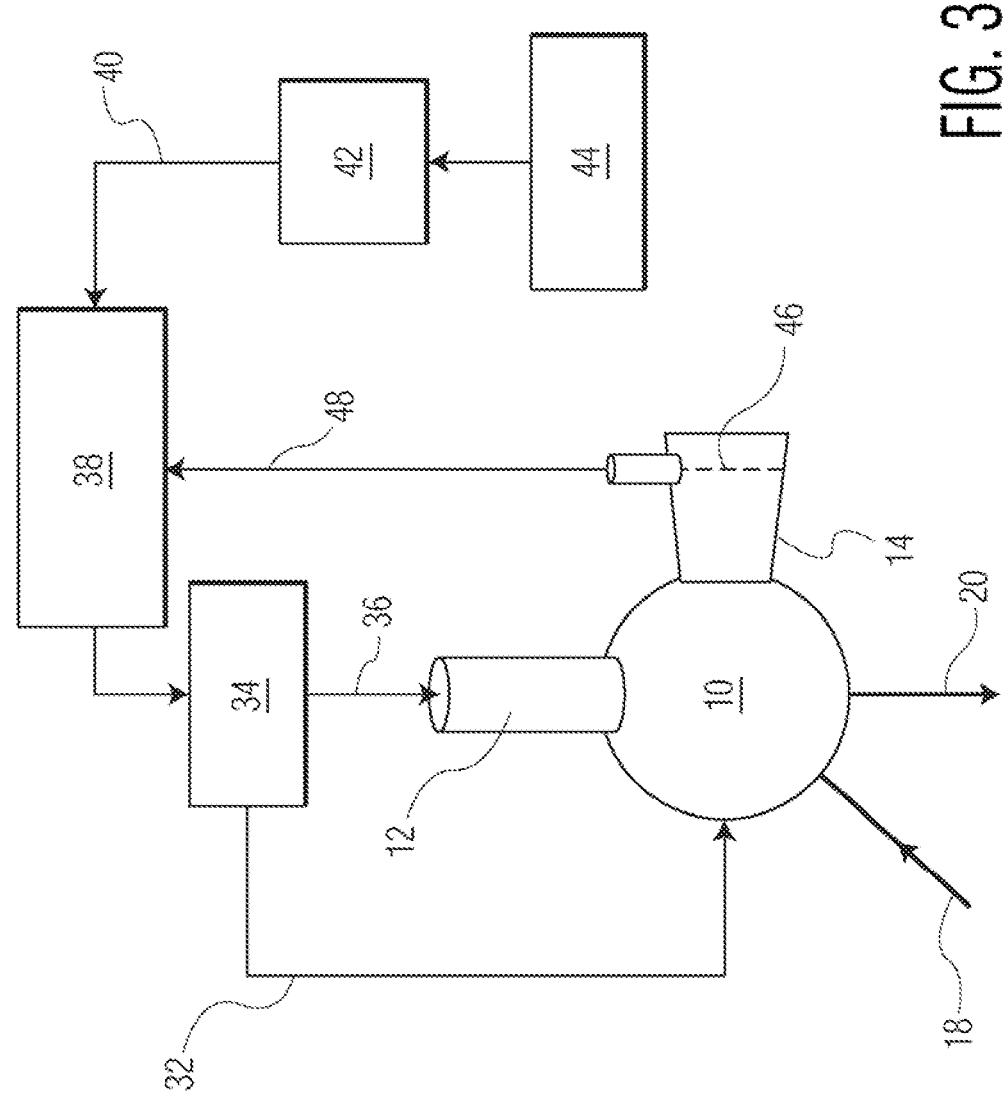
FIG. 3 is a block diagram of energy flow of the reactor system of FIG. 1, showing the reactor even more simplified than in FIG. 1

With reference to FIGS. 1-3, a plurality of Energy Extraction Cones 14 are disposed around central target region 10. Each of these cones is a portion of a vacuum system. They each contain an energy collection grid 46 which produces a High Voltage DC output which is used to drive the SXE Energy Drivers 6. Energy Extraction Cones 14 may be formed in other shapes, such as cylinders. A detailed discussion of this process is found in the discussion of FIG. 3 below.

The system of FIGS. 1-3 contains a second energy extraction means which may suitably be a standard Rankine Cycle Thermal loop. Coolant is introduced into an inner heat exchange sub-system 24 by an Inlet Pipe 18, circulated through the heat exchanger 24 and then exited from the reactor via pipe 20. The heated coolant is used to drive a turbine which in turn drives a generator to produce electricity. Most of this electricity is available to supply external energy grids. A small portion is used to provide so-called make-up power to the system to compensate for the small inefficiency of the HVDC Energy Extraction Cones 14. A Fuel Pellet injection system 16 is used to inject the fusion target pellets into the reactor. In the actual system, pellet injector 16 is oriented vertically as shown in FIG. 2B.

FIGS. 2A-2B show principal internal and external components and their geometric relationship. In FIG. 2A, we see a cross-section of the reactor. The disposition of the Energy Drivers 12 and the Energy Extractor Cones 14 is clearly visible. Also visible are the inner structures of the reactors, which are shown in detail in FIG. 20. The reactor chamber wall is the outermost layer, shown at 10, which provides structural support for the internal structures and also is the vacuum enclosure. While depicted as a spherical object, other shapes may be successfully employed. The shape of the chamber has no impact on the functionality of the system.

The next innermost layer consists of magnetic confinement coils 30. These coils create a strong magnetic field that confines the fusion plasma and keeps it from contacting the liner 28 and other internal structures. The magnetic field produced by the magnetic confinement coils 30 has apertures (low field regions) which correspond to the locations of the energy extractor cones and SXE energy drivers.

The next innermost layer is the coolant passage layer (heat exchanger) 24. Coolant enters this structure through the coolant inlet 18, circulates through the coolant passages 24 and exits in a superheated state via the coolant outlet 20. This superheated coolant is used to power a turbine & generator to produce electricity. In this view, the pellet injector 16 is seen in its proper vertical orientation.

FIG. 3 is a block diagram of energy flow of the reactor system of FIG. 1. The two energy extraction loops are shown. The thermal loop consists of the thermal coolant inlet 18, the thermal coolant outlet 20, and the coolant passage layer (heat exchanger) 24. The operation of this loop is described above in the discussion of FIG. 2. The High voltage DC Extraction loop consists of the Extractor Cone 14, the Extractor Grid 46, the DC return 48, the Energy Storage and Power Conditioning means 38, the Pulse Modulator 34, and its two synchronized outputs (a) 36, HVDC to the SXE Energy Driver 12 and (b) 32, the Magnetic Confinement Drive signal. Fundamental to a preferred embodiment of this invention is the use of directly extracted high voltage DC to driver the SXE energy drivers. The SXE runs on high voltage DC, so it is directly compatible with the direct DC output of the energy extractor cones 14. The extracted energy is used to recharge the energy storage means 38. The energy storage system can utilize either a capacitive storage means or an inductive storage means or both, by way of example. The use of capacitive storage is the preferred embodiment for this portion of the system. The Energy Storage and Power Conditioning sub-system 38 has a second energy input 40 which allows power from external sources (e.g., 42, 44) to be applied to the system. External source 42 can be an Electron Coupled Transformer as described below, and external source 44 is a high voltage DC power supply. The power from second energy input 40 is used for system startup and also to provide make-up power during operation. This is to compensate for the inefficiency losses in the described HVDC extraction loop.

Figure 4A:
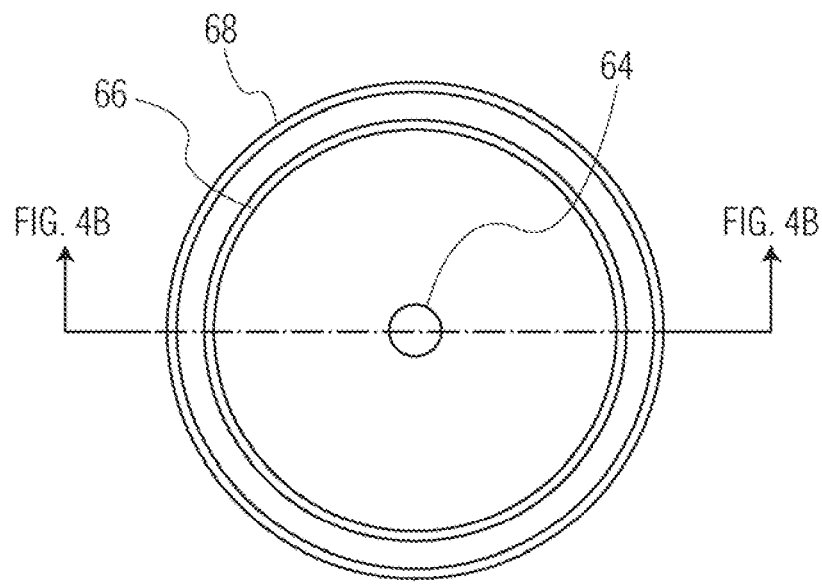
FIGS. 4A and 4B are simplified end and side cross-sections, respectively, of a basic Stimulated X-ray Emitter (SXE) Energy Driver.
Figure 4B:
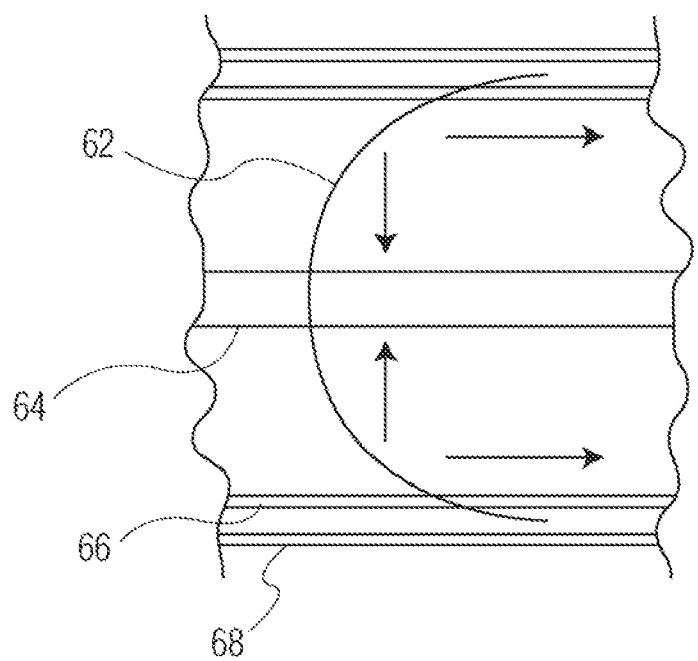

FIGS. 4A and 4B are cross-sections of the basic SXE Energy Driver, which may be used as energy drivers 12 in FIG. 1. FIG. 4A is an and view and FIG. 4B is a side view. Visible in these views are an Anode 64, a Grid 66, and a cathode 68. The SXE is a triode electron tube. It has a novel electron gun structure, comprised of the cathode 68 and the grid 66. The physical juxtaposition of these elements is such that it forms a circular waveguide. A circular waveguide supports the Transverse Electric Mode (TEM) which always propagates at the Speed of Light ("c") in a vacuum. This property is critical to the function of the SXE in that it ensures that the electron beam, as shown by arrows, sweeps the anode at the speed of light and thus the phase velocity and the group velocity of the wavefront are matched. This is known as the Collapsing Traveling Wave. This is important in the x-ray formation process in that it ensures that the x-rays formed by the beam are always traveling in a highly ionized zone and are therefore not absorbed by self-absorption processes.

The grid structure (discussed in detail in FIG. 5) is highly symmetrical. This ensures that the collapse of the wave towards the anode is perfectly symmetrical. As a result, when the electrons strike the anode, they create a highly ionized region of Bremsstrahlung. There are also a large number of secondary electrons present in such highly ionized region. The anode is filled with a lasing material. The Bremsstrahlung photons strike atoms of the lasing material and, as a result of their being at significantly higher energy than the K-shell ionization potential of the atom, they totally ionize the atom. The resulting repopulation cascade causes the release of photons from each electron shell of the atom. The surplus of electrons ensures that this process occurs very rapidly. A cascade reaction follows. The radiation is, at first, isotropic. But as it proceeds along the length of the anode, off-axis radiation is either suppressed by the wall of the abode or used to ionize other atoms. All of this takes place in the ionized zone that sweeps along the anode at "c" (in a vacuum). The resulting beam is collimated geometrically by the anode and consists mostly of K-shell photons, L-shell photons, and M-shell photons when they are present.

Figure 5B:
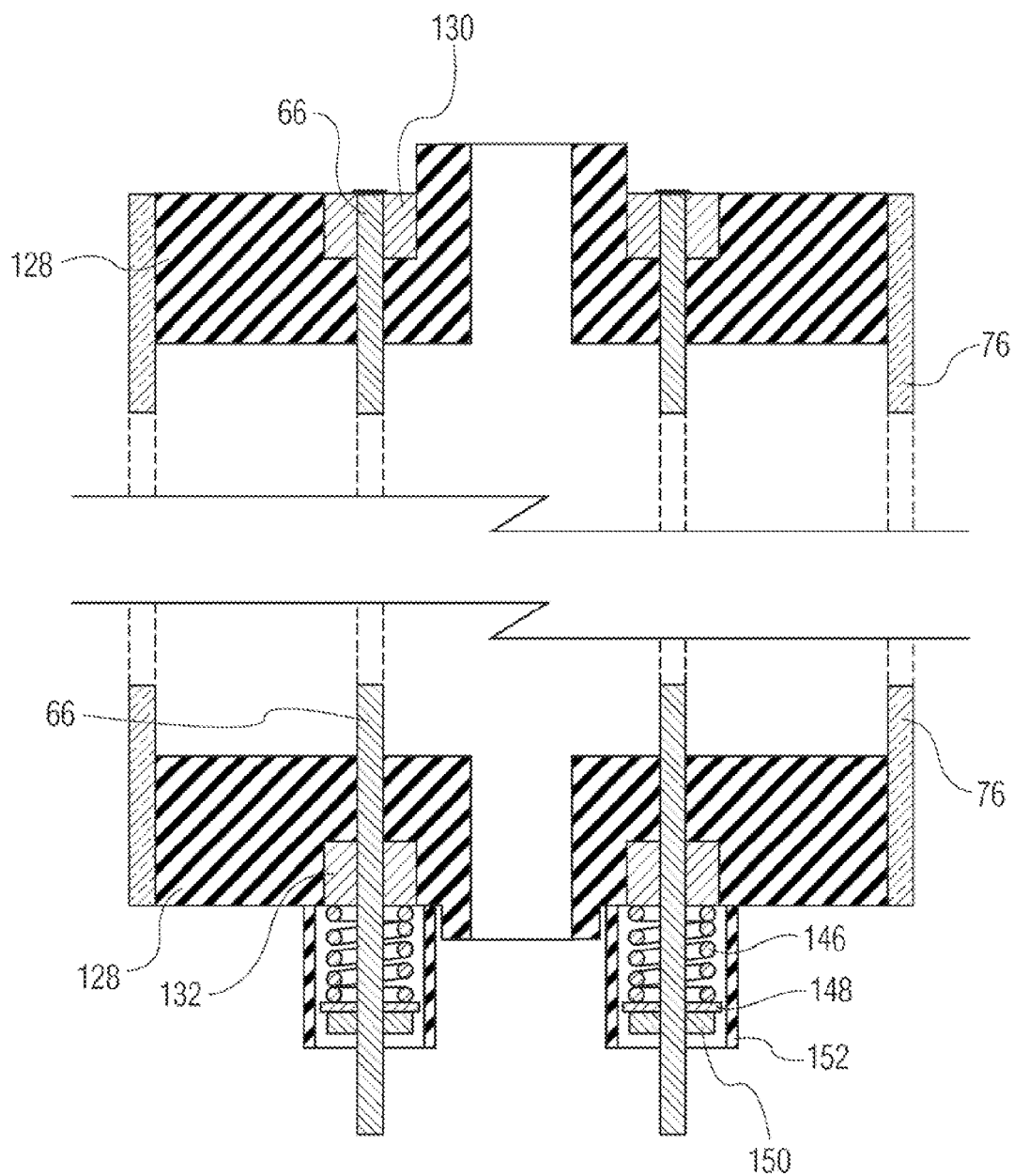
FIG. 5B is a view of the Grid and Phase Matching Network of FIG. 5A showing the cross section indicated as "FIG. 5A-FIG. 5A" in that figure.
Figure 5C:
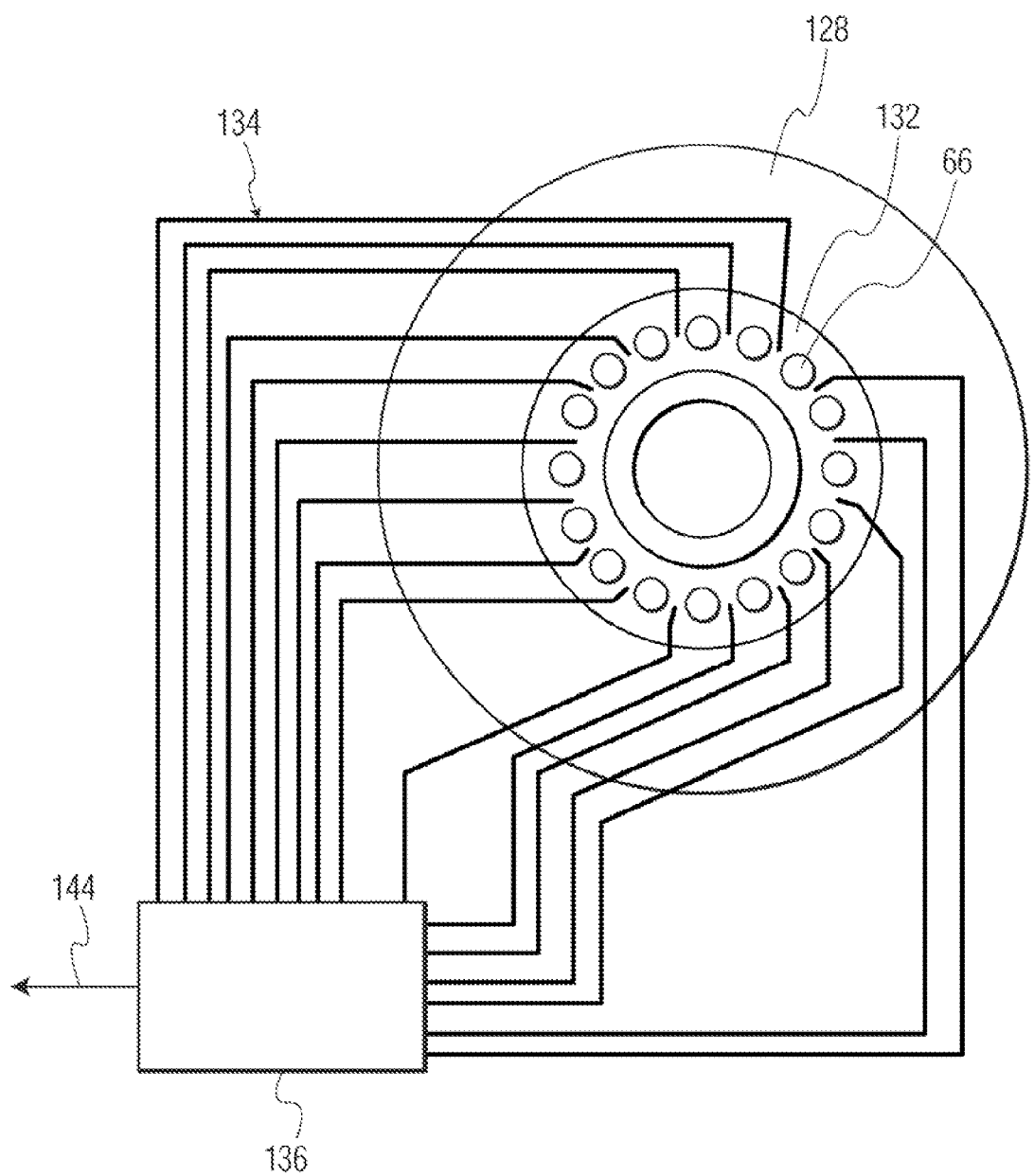
FIG. 5C is a schematic diagram of the Phase Matching Network of FIG. 5A.

Referring now to FIGS. 5A, 5B and 5C, these figures show details of the Grid and Phase Matching Network of the SXE of FIGS. 4A and 4B. FIG. 5A shows the entire Grid-Phase Matching Network and details of the Grid insulation. These two elements are actually part of a single structure. FIG. 5B shows details of a preferred Grid Tensioning and insulating means. FIG. 5C shows the electrical schematic of the Phase Matching Network. Common to all tubes with Traveling Wave Electron Guns (TWEG) are the design requirements for the grid. No matter what scale or power level the tube is designed for, the following characteristics are common and must be present in order for the Traveling Wave Electron Gun to operate.

The Traveling Wave Electron Gun (TWEG) is a unique structure in that it uses the close juxtaposition of the grid 66 and the cathode 68 to produce a Circular Waveguide structure that supports a Transverse Electric Mode (TEM). The Transverse Electric Mode in a Circular waveguide always travels at the speed of light ("c") (in a vacuum). This aspect of the TWEG accounts for its extremely fast risetime (one nanosecond for each foot or 30.48 cm of gun length).

The grid is also used to both produce the electric field necessary to extract electrons from the cathode and to control the flow of such electrons. This is accomplished by selectively biasing the grid relative to the cathode. Both switching and modulation functions can be attained by appropriate biasing of the tube.

There are several critical conditions that must be met when designing a grid for a TWEG structure. They are:
(1) The grid-cathode spacing must be constant across the length of the grid. This is usually accomplished by placing the grid under high tension or building it with a rigid structure
(2) The number of elements in the grid must be high enough to ensure a constant and uniform electric field in the grid-cathode region.
(3) There must be no sharp edges or burs anywhere on the grid structure. Individual elements can be round, flat or high aspect-ratio elliptical shapes. All edges must be fully radiused. In this context, fully radiused means that the edge in question has a radius equal to half the thickness of the material; an example of fully radiused appears at 125 in FIG. 14.

The actual implementation of these design rules is determined by the size of the grid being built. The grid can be made from a single piece or, more commonly, a series of individual elements constrained by mounting rings on either end 130, 132, provided with suitable electrical insulators 136, 140 to prevent arcing, and a means of maintaining tension on the grid structure. In the preferred embodiment shown, each grid element is provided with a tensioning means in the form of a heavy spring 146, washer 148, and nut 150. The nuts of the various grid elements are tightened with a torque wrench to ensure uniform tension on all elements.

The electrical connection to the grid is made by means of a phase matching network 134, 136 that is connected to the input end of the grid. The phase matching network consists of a series of wires 134 of exactly equal length, with a typical tolerance of +/−0.0005" (+/−12 microns). Each wire of the phase matching network is connected to the lower grid support ring 132 at a point equidistant from the two adjacent grid elements. There is a plurality of phase matching network wires symmetrically disposed around the grid support ring.

The other ends of the phase matching network wires are connected to a common connector element 135. This has a number of holes on one end equal to the number of phase matching network wires, and a single hole on the opposite end. A wire is attached to this hole and runs to the grid vacuum feedthrough. The wires are silver soldered or welded by the Tungsten-Inert Gas method (TIG) as appropriate. TIG welding is preferred but not always possible.

The purpose of this phase matching network is to ensure that the entire base of the grid responds to the control signal at the same moment with an accuracy that is preferably in the picosecond range. This results in a highly symmetrical wave propagating in the TWEG structure. This wave of ground potential has the effect of allowing energy stored in the grid-cathode gap and also energy available to the cathode to propagate to the anode resulting in conduction of this signal. When the grid is grounded through the phase matching network, a radially symmetrical collapsing travelling wave of electrons is formed and propagates along the length of the TWEG structure.

Hydrodynamic Instability

Causes & Remediation

Figure 6:
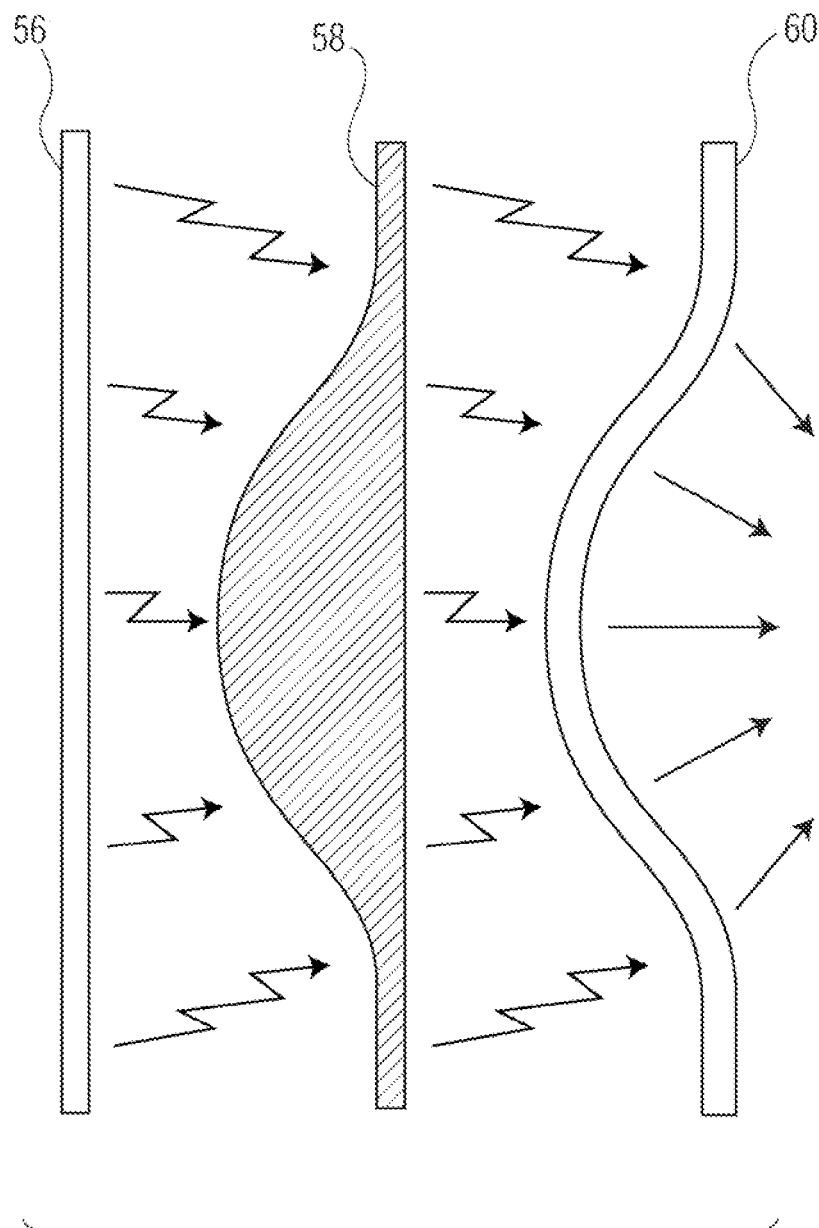
FIG. 6 is a sectional view of a planar wavefront impinging on an Apodizing filter and the corrected wavefront produced by passage through the filter.

FIG. 6 shows the operating principle of the Apodizing Filter, with wavefront movement shown by arrows. Optimal performance of any fusion system depends on creating a perfectly symmetrical compression of the fuel target pellet. The Energy Drivers 12 (FIG. 1) of the current invention provides a means of symmetrically illuminating the target. If the wavefronts 60 that impinge on the target are given a concave geometry whose radius matches the radius of the target pellet, then it is possible to create an almost perfectly symmetrical compression wavefront on the fuel target pellet. The reason that this is necessary is to minimize the Rayleigh-Taylor Instability which, if severe enough, can cause the fuel pellet to heat in a non-uniform fashion and thus not ignite in a fusion reaction. If necessary, additional Energy Drivers 12 can be added in symmetrical pairs to increase the uniformity of compression wavefronts. Geometric considerations determine the number of drivers that are added. If six drivers is not sufficient, the next step would preferably be 12 drivers, followed by 14 drivers, followed preferably by 20 drivers. Other numbers of Energy Drivers are possible.

The Anodizing Filter 58 of FIG. 6 consists of an object of varying thickness that is placed in the beam path. The cross-section is matched in thickness to the radius of the target. In the preferred embodiment, these filters are made from thin film materials that are deposited to create the desired cross-section. The selection of the material is determined by the energy drive requirement of the fusion fuel combination. In the case of the Deuterium-Tritium reaction, this is between 250 and 350 electron volts, then materials with a very low atomic number such as Lithium, Beryllium, Boron or Carbon would be used. Higher energy reactions such as Hydrogen-Boron would use either these materials or possibly Magnesium, Aluminum or Silicon. It is important that the Atomic number of the density material not be so high that significant absorption occurs. It is noted that the Apodizing Filter will produce some scatter radiation but that is not a problem in the current invention.

Fundamental to the process of fusion reactions is the minimization of Rayleigh-Taylor instabilities (RTI) that occurs during compression of the fusion target material. For spherical target geometries, the ideal compression wavefront is a concentric spherical wave that reduces in diameter with perfect symmetry. In practical equipment for controlled fusion reactions, this is extremely difficult to attain.

It is important to note that diffractive optical techniques in the form of elements such as Zone Plates can also be used to correct the wavefront. Zone plates are well known in optical sciences. The extension to the soft x-ray portion of the spectrum is simple and has already been reported in the literature.

Comparison of Direct X-ray Drive Fusion to Laser Inertial Confinement Fusion

The challenge that faces designers of fusion rectors is how to achieve similar symmetrical compression of the fusion target. A wide range of solutions has produced numerous reactor geometries. The present discussion focuses on the specific case of systems that use fuel pellets as the fusion target material. This class of systems is known as Inertial Confinement ("ICF") systems. Common to all ICF systems is to have the driver energy presented to the target as a collective series of combined synchronous energy beams. The combined synchronous wavefronts of the energy beams approximate a collapsing spherical shell. In general, the more beams utilized, the better (or more spherical) the confinement. This can be appreciated most clearly in the area of Laser driven fusion where the most successful systems have the highest number of beams. Systems such as the NOVA laser have upwards of 50 beams. The new National Ignition Facility (NIF) at Lawrence Livermore National Laboratory (LLNL) has 192 synchronous beams and is expected to have significantly better confinement than predecessor systems such as NOVA (LLNL), OMEGA (LLNL), and GEKKO (Japan).

The basic principles of ICF described as follows are:
(1) Confinement times,
(2) burn fractions, and
(3) the need for target compression implosion.

The implosion process of a typical direct-drive ICF target is roughly divided into three phases: initial phase, acceleration phase and deceleration phase. (The presently claimed invention uses a direct drive system.) In the initial phase, first shock wave travels in a fuel pellet and the fluid in the pellet is accelerated mainly by the shock wave. The outer (or ablative) shell is ablatively accelerated inward in the second phase. Then, fuel is compressed heavily in the deceleration phase. In the initial phase, perturbations on the target surface are seeded by initial imprint due to laser irradiation nonuniformity, along with the original target surface roughness. These perturbations are accompanied by rippled shock propagation before the shock breaks out on the inner surface of the fuel pellet, and further accompanied by rippled rarefaction propagation. The perturbations grown on the outer surface due primarily to the R-T instability in the second (acceleration) phase are then fed through on the inner surface. (Nakai Reference.)

In the mentioned ME facility, 192 laser beams are utilized to produce 1.8 Megajoules of energy and consume 500 Tera-Watts of power, of which 30 KiloJoules is ultimately transferred as x-rays into the deuterium-tritium fuel in the target fuel pellet. With ignition and successful burn, the fuel can produce some 600 to 1,000 times more energy than is put into it. This produces an intense flux of x rays of almost 1,000 terawatts per square centimeter.

The large number of beams in the NIF facility will allow the laser illumination to more closely approximate a uniform x-ray field than did the mentioned NOVA facility. Nevertheless, a basic asymmetry will still exist due to hot spots heated directly by the laser beams and cold spots where heat is lost through the laser holes. Because ignition is dependent upon smooth x-ray illumination of the pellet, target designers intend to reduce asymmetries in the x-ray flux to less than 1 percent by properly locating the laser-heated hot spots, adjusting the exact length of the hohlraum that contains the pellet, and modifying the laser pulse intensities. Hohlraums are used with indirect drive systems, in contrast to the presently claimed direct x-ray drive system.

The mechanism of Laser driven ICF is premised on light being absorbed at the hohlraum cylinder walls, which converts the laser light into soft x-rays. The hohlraum is made of a high atomic number material such as gold, which maximizes the production of x-rays. These x-rays are rapidly absorbed and reemitted by the walls setting up a radiation driven thermal wave diffusing into the walls of the hohlraum. Most of the x-rays are ultimately lost into the walls, some escape out the laser entrance holes, and the rest are absorbed by the target pellet in the center of the hohlraums and drive its implosion. Typically this coupling to the pellet is a less than of the total energy, or about 0.2 for a power plant scale laser heated hohlraum. Thus, coupling for indirect drive is relatively poor compared to direct drive. (Rosen Reference.)

Indirect drive is less efficient at coupling energy to a pellet than direct drive because of the conversion to x-rays in the hohlraum. However, indirect drive is less sensitive to variations in beam intensity and hydrodynamic instabilities. The ignition threshold for directly-driven and indirectly-driven targets is about the same. However, the gain is calculated to be about a factor of 2 greater in directly driven targets.

The choice of the x-ray temperature is crucial because it dictates the material forming the pellet's outer, ablator layer, key to the implosion and subsequent ignition reactions. If this layer is smooth enough and bathed uniformly in x rays, its ablation will efficiently force the pellet inward at a velocity of about 400 kilometers per second (more than one-thousandth of the speed of light) and create the pressure and temperature required for fusion reactions to begin. (Haan Reference.)

One of the key issues in minimizing Rayleigh-Taylor instabilities concerns the x-ray flux interacting with the ablator surface. At higher fluxes, the ablation of the material also carries off the growing perturbations. Initial perturbations are also minimized by making pellet layers as smooth as possible. Laser-plasma instability and hydrodynamic instabilities are complementary threats to ignition, and the targets are intentionally designed so that the two threats are roughly balanced. Higher temperatures requiring higher laser intensities worsen laser-plasma instabilities but minimize hydrodynamic instabilities. In turn, low temperatures minimize laser-plasma instabilities but magnify hydrodynamic instabilities. As a result, designers have arrived at low and high x-ray temperature boundaries, about 250 electron volts and 350 electron volts for the specific case of Deuterium-tritium fuel, beyond which efficient implosion and ignition are difficult to attain (optimum conditions. Other fuels have higher energy requirements.

The fundamental difference between the dynamics of implosions directly driven by lasers and those driven by x-rays is that lasers are absorbed at relatively low electron density, n, corresponding to the critical electron density for the wavelength of that laser, whereas x-rays are absorbed deeper into the target at solid material densities, which, when ionized by the x-ray flux, are at very high electron densities. Thus even if the laser is at ⅓ mm light, the typical x-ray absorption region has electron densities nearly 100 times larger.

To achieve the conditions under which inertial confinement is sufficient to achieve thermonuclear burn, an imploded fuel pellet is compressed to conditions of high density and temperature. In the laboratory a driver is required to impart energy to the pellet to effect an implosion. There are three drivers currently being considered for ICF in the laboratory:

(1) High-powered lasers,
(2) accelerated heavy ions, and
(3) x-rays resulting from pulsed power machines.

We define the ablation velocity by $r V_{abl} 5$ dm/. We expect a full order of magnitude difference in $V_{abl}$, between direct and indirect drive. Direct drive, by virtue of its overall better coupling [$\acute{\eta}_r$ of order (0.8)(0.1)=8% versus indirect drive (0.2)(0.2) 4%] has advantages over indirect drive, both in terms of gain, and in terms of a smaller driver, but is challenged by the RT instability. (Barnes Reference.)

The pressures, P, will scale as $nT\acute{\alpha}n^{1/3}/^{2/3}$. By this scaling we would expect about a factor of 5 difference in pressures between direct and indirect drive, and indeed at equal energy fluxes of $10^{15}$ W/cm², ⅓ mm laser light has a pressure of about 90 MB, whereas x-rays produce an ablation region pressure of about 400 MB. The higher pressure attainable with direct x-ray drive coupled with the higher coupling efficiency make it a more desirable candidate. One of the reasons direct x-ray drive has not been chosen for large scale experiments to date has been the unavailability of suitable drivers.

In order to achieve conditions for ICF, targets have a spherical shell filled with a low density (≤1 mg/cm') equimolar mixture of deuterium and tritium (DT) gas. The spherical shell consists of an outer ablator and an inner region of frozen or liquid DT. Energy from the driver is delivered to the ablator which heats up and expands. As the ablator expands the rest of the shell is forced inward to conserve momentum. The pellet behaves as a spherical, ablation-driven rocket. As the pellet implodes, the compression wave heats the central region. Electron conduction and radiative losses act to cool the central region. Fuel convergence ratios of 30-40:1 and a central fuel temperature of 10 Key are required so that α particle deposition from thermonuclear burn of DT can overcome conduction and radiative losses and a self-sustaining burn wave can be generated.

An asymmetric implosion will convert less of the available energy into compression. Assuming the available energy is such that a 25% variation in symmetry is tolerable at peak fuel compression, then less than 1% variation in symmetry is acceptable in the precompressed pellet. (Barnes Reference.)

The preceding discussion explains the dynamics of target implosion physics, the relative efficiencies and trade-offs of the direct and indirect drive schemes and the impact of Rayleigh-Taylor Hydrodynamic Instability (RTI). Prior work has focused on improving the uniformity of laser illumination to minimize the effects of RTI. We note that once the fuel pellet is ignited, there is no difference between direct and indirect drive fusion systems.

Since lasers are the most prevalent high energy drive source, they have been the focus of most of the research. Heavy ion beams have been used but those systems tend to be less efficient than the laser drive systems. A small percentage of work has been done using direct x-ray drive. This has been mostly done with either Z-pinch or plasma focus drivers. Neither of these systems has demonstrated the reliability or efficiency for practical direct drive x-ray fusion processes.

The Stimulated X-ray Emitter (SXE) of U.S. Pat. No. 4,723,263 is uniquely suited to resolving both the driver and the RTI issues. This system scales efficiently to the sizes necessary to drive fusion reactions. If we take NIF value of 30 KiloJoules of x-ray flux as being necessary to drive a fusion reaction, we can scale an SXE system accordingly.

If we use 6 drivers, then each driver needs only produce 5 KiloJoules. Twelve drivers scale to 2.5 KiloJoules and 20 drivers scale to 1.5 Kilojoules. The following shows what is necessary to produce a 2.5 KiloJoule (for example) SXE driver.

Early research with the SXE showed that is has 10% conversion efficiency. Thus, to achieve 2.5 Kilojoules output, 25

KiloJoules DC input per driver are required. Assuming we operate a one foot (30.48 cm) diameter SXE at 500 KV, we get approximately 3.5 KiloJoules per linear foot of driver. Further assuming we want a 20 nanosecond x-ray pulse; this means that a 20 foot long SXE (6.1 meters length) would be required. A 20 foot (6.1 meter) SXE would thus be capable of 7 Kilojoules of x-ray output. So this driver could actually be used in a 6 driver configuration. The use of 20-foot drivers yields a compact system "footprint" of 3,600 square feet (335 square meters) and occupies a cube with 60 feet to a side (216,000 cubic feet or 6,116 cubic meters). Such a system is sufficiently compact to be used in maritime applications, such as in aircraft carriers and other major naval vessels or dedicated floating power plants.

This is very attractive except when one considers the RTI issue. The SXE produces a nominally planar wavefront in its output pulse. In a 6-driver configuration, it is clear that RTI would probably preclude a successful reaction from occurring.

If, however, we are willing to accept a small loss of efficiency, it is possible to introduce an Anodizing filter into the x-ray beam, as discussed above in connection with FIG. 6. As used herein, "an Anodizing filter" means a quasi-optical element that has a transmission profile which is denser in the center than at the edges, with some controlled attenuation function from the edge to the center to the edge. This would be the x-ray equivalent of Anodizing filters that are routinely used with optical band lasers to control the wavefront shape. The filter for the SXE would be built to produce a concave wavefront. The symmetrical assembly of concave wavefronts would be highly beneficial in suppressing RTI by increasing the uniformity of the compression wavefront. The use of more than 6 drivers, in configurations such as 12, 14, 20 or more drivers offers the potential for increased uniformity of the compression wavefront. The advantage of using an Apodizing filter is to minimize the number of drivers required which lowers the total cost and complexity of the system and increases the reliability of the system.

This concept can be extended to optical drive fusion systems as well. However, given the advantages of Direct X-ray drive, particularly when one consider the fast reaction group of processes, the use in optical drive systems, while certain to improve performance, is negated by the advantages of X-ray drive.

While the use of a variable density object as an anodizing filter is considered the preferred embodiment, it is noted that it is possible to use diffractive optical techniques to construct an anodizing filter for the soft x-ray band. A typical form of diffractive optic is the Zone Plate. This device uses Fresnel zones to modify the wavefront. Such a diffractive filter is currently more difficult to manufacture than a variable density type anodizing filter.

Energy Storage Enhancement of SXE

Figure 7:
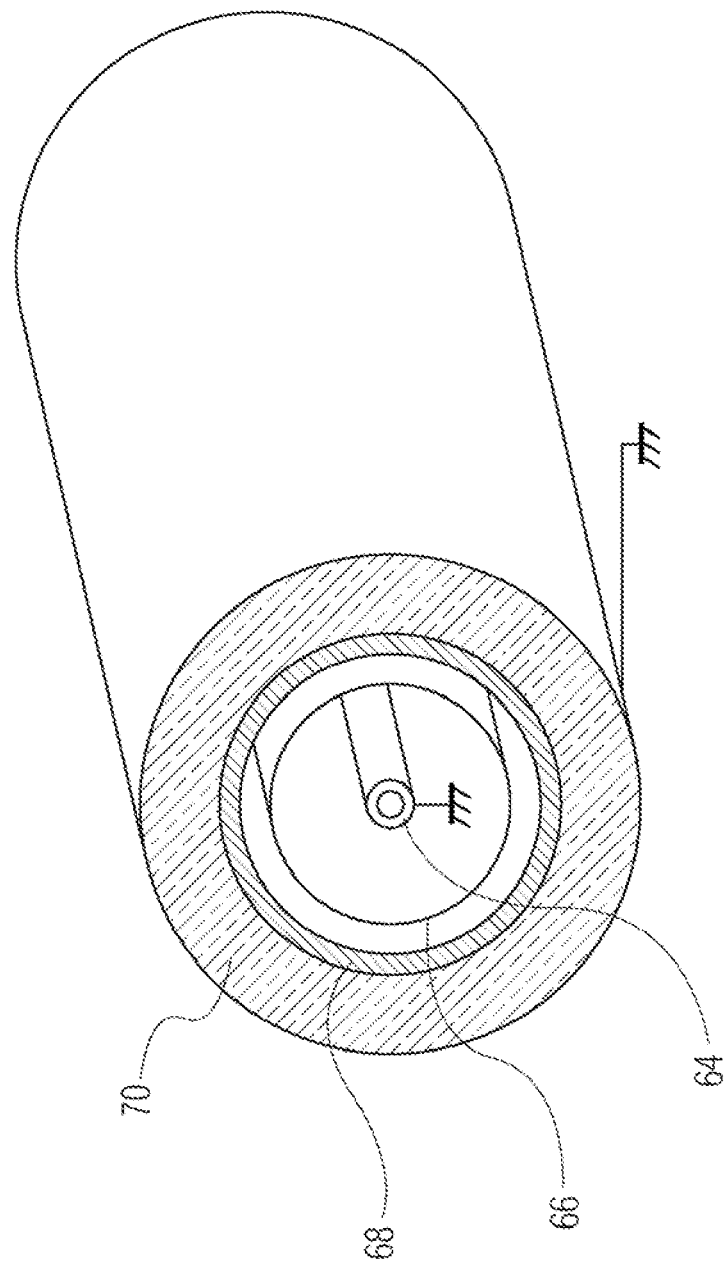
FIG. 7 is a perspective view of a capacitor enhanced version of the SXE of FIG. 4.

FIG. 7 shows a projected view of the SXE driver enhanced with an energy storage capacitor 70 integrated directly into its structure. One of the most difficult problems associated with controlled fusion reactions is getting a sufficient amount of energy into the reaction in a very short period of time. It is necessary to deliver energy on the order of 30 KiloJoules of x-rays into the target in a few nanoseconds. Given that electricity travels at or near the speed of light, which equates to approximately one foot (30.48 cm) per nanosecond, and the time available to do this is only a few nanoseconds, it becomes clear that the energy storage means must be proximate to the means of energy delivery.

This issue is addressed in the design of the SXE driver 12 of FIG. 4 by adding a coaxial capacitor to the external surface of the SXE, as shown in FIG. 7. The external surface of the SXE is the outside surface of the cathode 68, so it offers a very large, low inductance means of connection. The entire inner surface of the capacitor is bonded in intimate electrical contact to the cathode. The capacitor is then wound around the SXE driver until it has a suitable diameter to provide the required capacitance to store the energy necessary for the reaction.

It should be noted that the cathode-grid interelectrode space is a capacitor by itself and stores a considerable amount of energy. A three-inch (75 mm) diameter structure stores approximately 200 picofarads per foot (30.48 cm). A two foot (61 cm) diameter device would store 1.6 nanofarads per foot (30.48 cm) if operated at 500,000 Volts and would store approximately 4 Kilojoules in the cathode-grid interelectrode space. Thus, the coaxial capacitor would only have to add one KiloJoule to meet the requirements of the fusion reaction. The reason that this enhanced storage means is included in a preferred form of current invention is for large scale commercial power generation. It also allows for shorter energy drivers 12 to be used if "Fast Fusion" reactions are contemplated. The trade-offs in x-ray pulse width and energy suggest the possible necessity for this enhancement.

Electron Coupled Transformer

Figure 8:
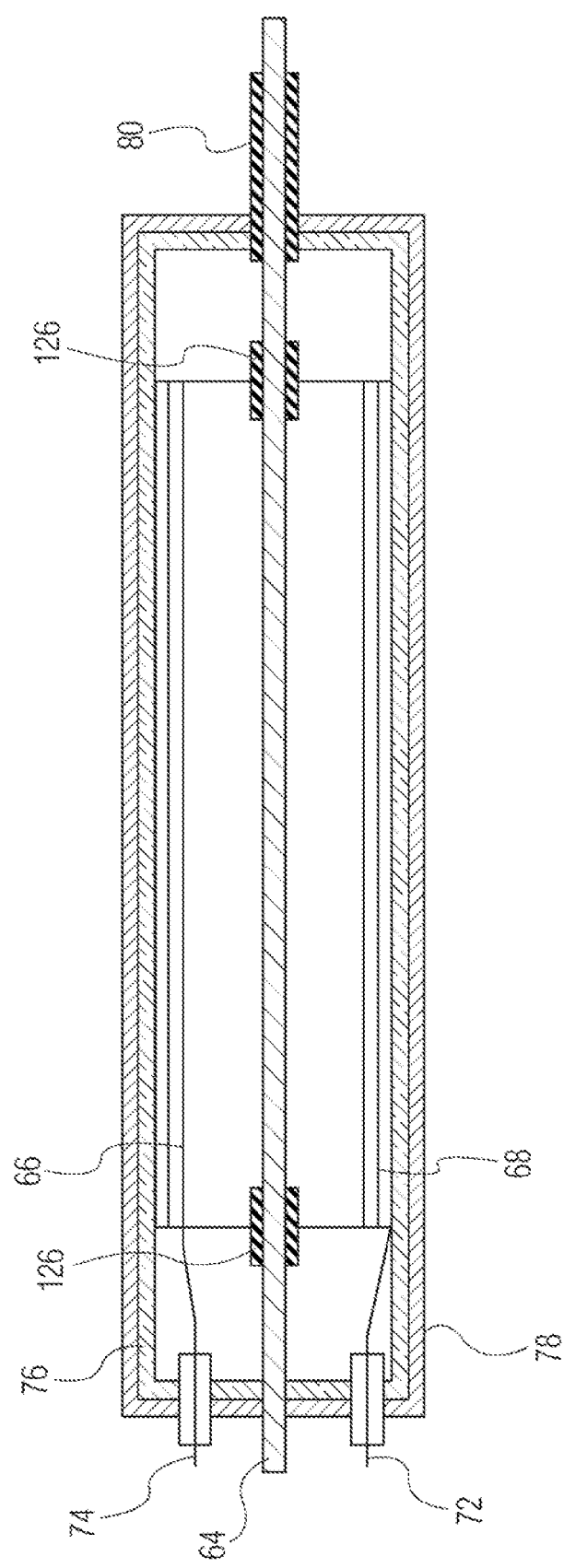
FIG. 8 is a sectional view along the length of an Electron Coupled Transformer.

FIG. 8 shows a cross-section of an Electron-coupled Transformer. The Electron Coupled Transformer (ECT) is a novel electron tube derivative of the SXE. The ECT is a pulse amplification device. It utilizes the same style electron gun as the SXE (i.e., cathode 68 and grid 66). The difference lies in the design and installation of the anode 64.

In the SXE, the anode is always hollow and filled with a lasing material. The input end (left, lower, FIG. 8) is always connected to ground. The inventor of the current invention realized that the basic SXE structure was very similar to a class of high speed transformers known as "Linear Adder Transformers". In these devices, the secondary is a "stalk" with one end attached to ground and the other end as the high voltage output terminal. A series of Toroidal secondaries are stacked on the stalk. These are pulsed in sequence, such that the time between pulses is equal to the propagation time of the pulse up the stalk. Each secondary pulse adds to the energy (voltage) in the secondary.

The disadvantage of the Magnetic Linear Adder Transformer is that the Toroidal primaries will go into saturation and collapse the field if they are driven with too large a pulse. This limits the amount of energy that one can extract from this type of transformer.

The inventor of the current invention realized that there was a strong similarity between the Linear Adder Transformer and the SXE. The both incorporated a "Stalk. Both used a sequential drive mechanism, but the SXE had a much larger current-handling capacity due to the large current-handling capacity of its cold cathode. In early SXE experiments, both ends of the anode were grounded so no high voltage was observed. An experiment was conducted in late 2006 where a version of the SXE was constructed that had only one end grounded and the other end highly insulated. A solid anode 64 (FIG. 8) was used in this test. A pulse was injected into the cathode and the anode output was measured. A final distinction between the Linear Adder Transformer and the ECT is that in the Linear Adder Transformer, the primaries are separate distinct entities. The pulse that results has a "staircase" leading edge as a result. The ECT, in its preferred embodiment, has a continuous primary (cathode) and thus has a smooth leading edge to its pulse. The ECT is much lighter than a Linear Adder due to the lack of magnetic cores. A 100 KV 100 KA ECT weighs less than 200 pounds (90.7 kilograms).

Figure 9:
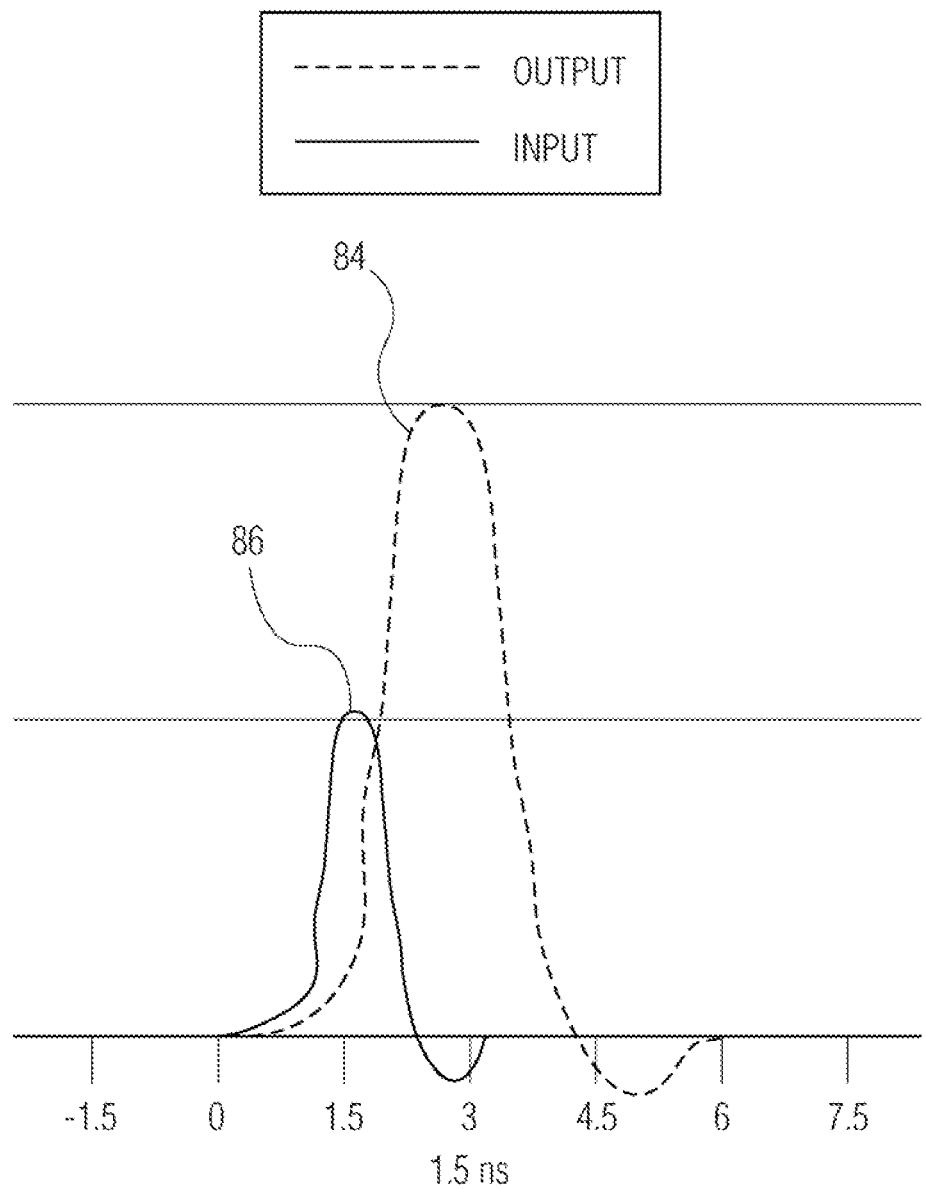
FIG. 9 shows the typical waveforms of the Electron Coupled Transformer of FIG. 8.

FIG. 9 shows the results of the foregoing test. The input pulse 86 and output pulse 84 were measured with identical voltage dividers on a high speed oscilloscope. The output pulse was several times larger than the input pulse, thus verifying the operational concept of the ECT.

The enormous energy handling capacity of the ECT gives us some options for the power supply design. The basic choices are:

(1) Individual Isolated Power Supplies 34, 38 (FIG. 3) for each driver 12 (no matter how many are used) which are synchronized by the use of high precision delay generators in each power supply.

(2) Two large power supplies 34, 38 (FIG. 3), one for each half of the total number of drivers 12, with a single delay generator to synchronize the two sides. High voltage is distributed by a network similar to the phase matching network 134, 136 (FIGS. 5A-5C) where the transmission line 36 lengths are controlled to ensure synchronization of the drivers 12.

(3) A single large supply 34, 38 to drive the entire system. High voltage is distributed by a network similar to the phase matching network 134, 136 where the transmission line 36 lengths are controlled to ensure synchronization of the drivers 12

While theoretically possible, the design of #3 above would not be practical for geometric and safety reasons. The High Voltage transmission lines 36 (FIG. 3) would be very long and there would be constant risk of arc discharge.

The design of #2 above is more practical but still has long transmission lines 36 (FIG. 3). It does, however, have the advantage of reduced system complexity and therefore higher reliability. The ECT 42 and Pulse Modulator 38 designs will handle the load imposed by this design.

The design of #1 above is the most complex, but in some ways the easiest to implement. The individual power supplies 34, 38 for each driver 12 would be of "modest size". The high voltage transmission line 36 from the power supplies 34, 38 to the drivers 12 would be extremely short, which is preferred. Each power supply 34, 38 would have to be controlled by its own delay generator and there would be a necessary tuning process where all the drivers 12 are brought into temporal synchronization.

We note that it is also possible to synchronize the drivers 12 by mechanical means. In this case, the physical length of the high voltage input line 36 would be adjusted by a small amount (fractions of an inch or millimeters) to achieve temporal synchronization of the drivers 12.

Referring back to FIG. 8, we see that the ECT is nearly identical in form to the SXE (FIG. 4) but the dimensions, anode, and output are different. In the preferred embodiment, the ECT is encased in a Glass Vacuum Envelope 76. There is a robust high voltage insulator 80 at the output, which provides a constant impedance electrical connection to the outside world. The Grid and cathode signals are fed in through feedthroughs 74 and 72, respectively. The entire device is encased in a Lead radiation shield 78 to contain the transverse radiation field that forms. The thickness of shield 78 is a function of the cathode voltage and is calculated by conventional means for determining a radiation safety shield.

We note that it is both possible and practical to utilize the coaxial capacitor energy enhancement scheme described above in the "Energy Storage Enhancement of SXE" with the ECT. This would be a convenient method of making additional energy available to the ECT for extremely high power applications.

Combined SXE & RF Energy Drivers

Figure 10:
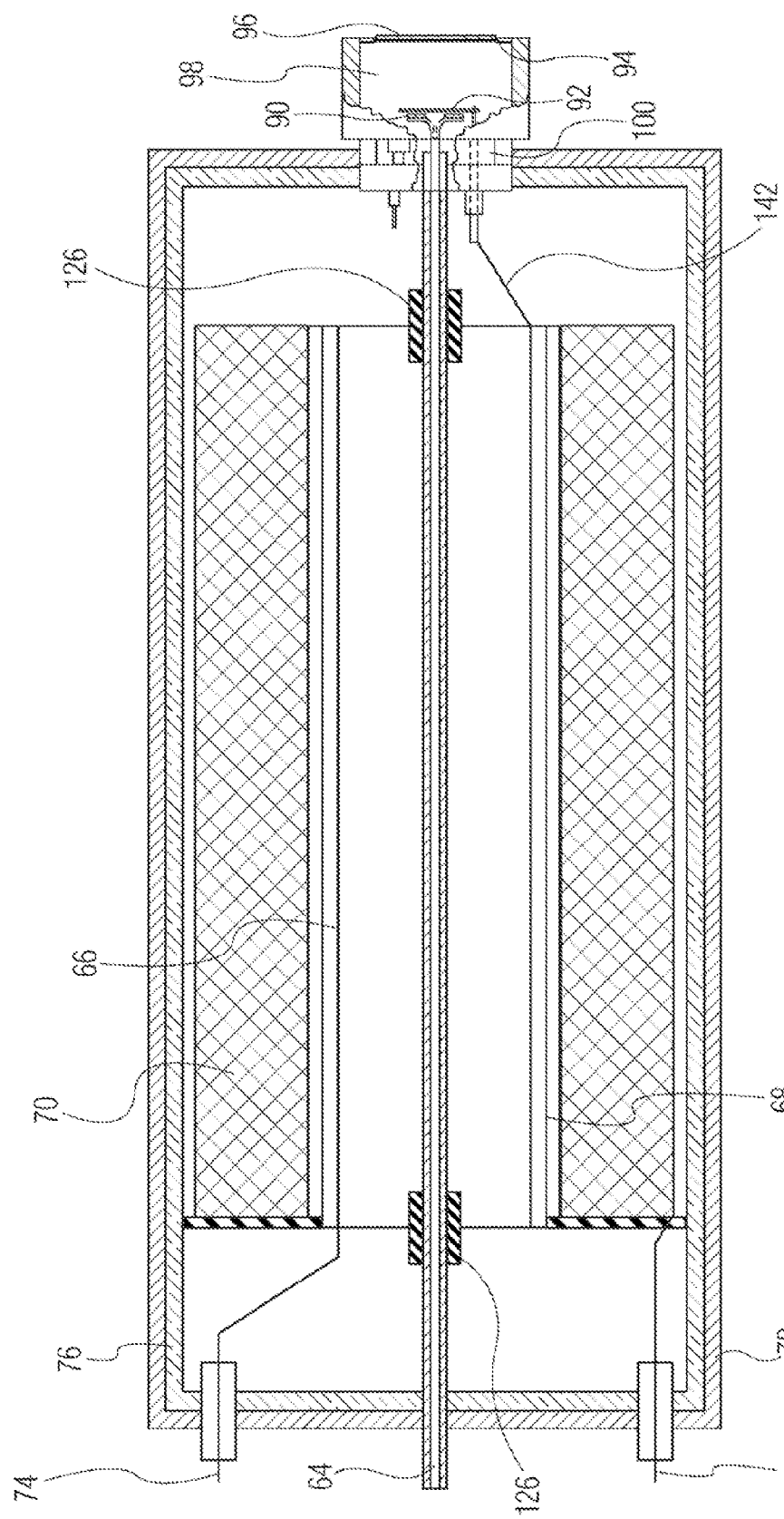
FIG. 10 is a sectional view along the length of a combined SXE-Vircator driver.
Figure 11:
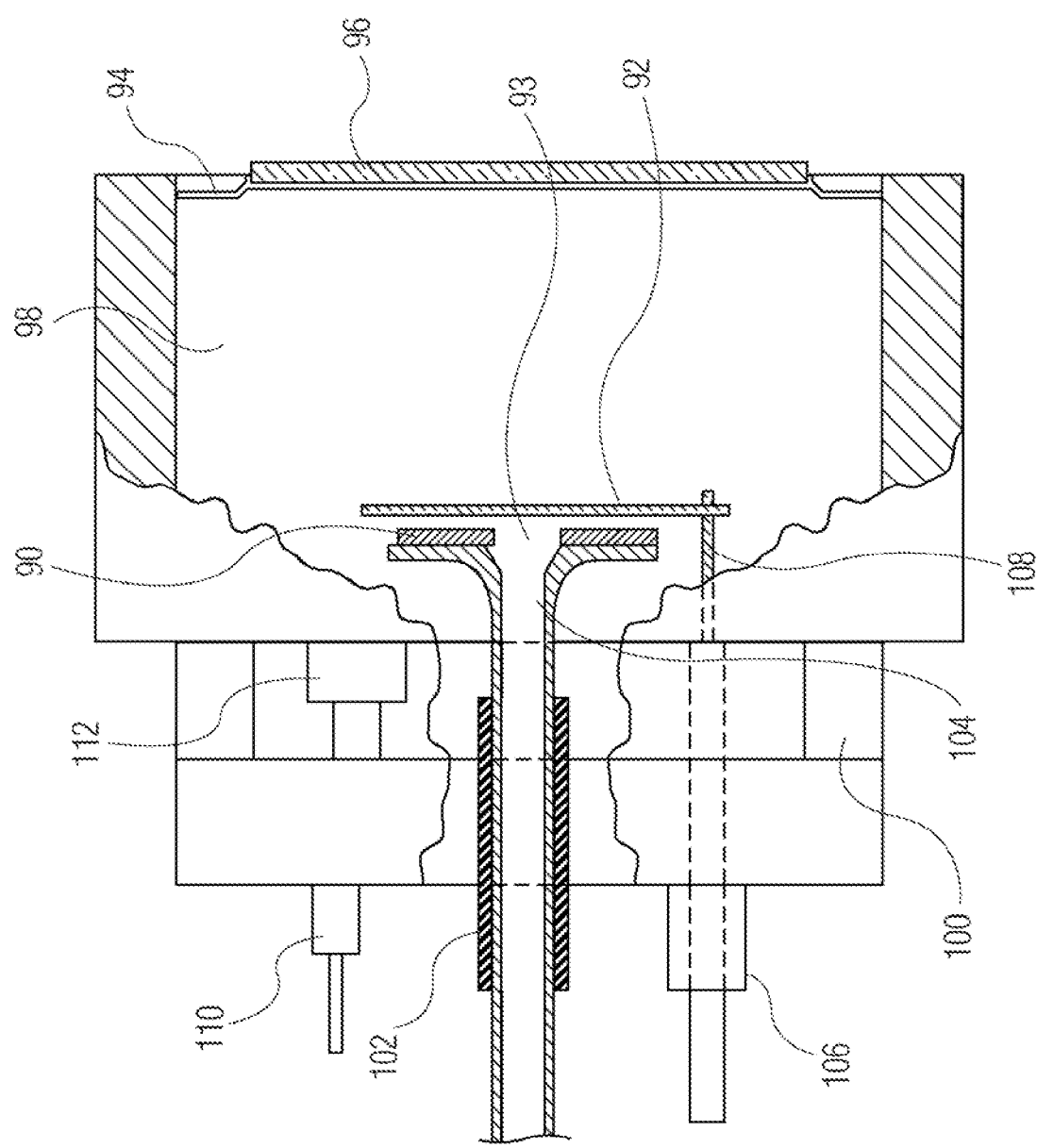
FIG. 11 is a partly sectional view along the length of the Vircator RE head of FIG. 10.

FIG. 10 shows an SXE combined with an RF generating means, and FIG. 11 shows the RF generating means. Specifically, a separate tube known generically as a Virtual Cathode Oscillator (Vircator) is mounted onto the output (right-shown) end of the SXE in FIG. 11. In this configuration, we take advantage of the Electron-Coupled Transformer (ECT) principle to use the high voltage pulse that is created by the SXE process and apply it directly to the cathode 90 of the Vircator. The Vircator body forms a resonant cavity 98 which oscillates when the cathode fires. A grid 92 controls the firing of the Vircatron. The control signal is obtained from the output terminal 142 of the grid of the SXE, which is located at the opposite end from the phase matching network. The trigger pulse is applied to the Vircator sequentially as a result of the Traveling Wave action of the SXE Grid. The Cathode and grid contain an aperture in their center that the x-ray pulse propagates through.

The novelty of the foregoing system is that it combines two techniques known by themselves, i.e., Direct x-ray drive and RF Heating, so as to realize increased system efficiency. This concept is practical because the SXE is going to generate a high voltage DC pulse whether it is used or not. However, if the RF heater is not employed, then the SXE output is grounded and no high voltage DC pulse occurs. The electrical energy then leaves the system in the form of a current pulse in the ground return. But, because the HVDC pulse is available, it makes sense to use it, particularly since using it does not affect the x-ray output.

FIG. 11 shows a cross-section of the Vircator RF head. The principle components are the cathode 90, the grid 92, a mesh anode 94, a resonant cavity 98, and an output window 96. The drive pulse comes directly from the anode of the SXE 12, which is attached directly to the Vircator cathode via the cathode feedthrough 102. The Vircator is triggered by the output signal from the SXE grid 142. When the Vircator is triggered, a burst of RF energy is formed by oscillation in the resonant cavity 98. This energy has a spectral distribution that is determined by the dimensions of the cavity 98. Typically, this energy is between 200 MHz and 2.5 GHz. The energy exits the Vircator and enters the Target Chamber 10 by the output window 96. The Vircator is one type of RF source that can be integrated to the SXE 12 to increase system operating performance. The Vircator cathode 90 has an aperture 93 in its center through which the x-ray pulse from the SXE passes into the target chamber 10.

Figure 12:
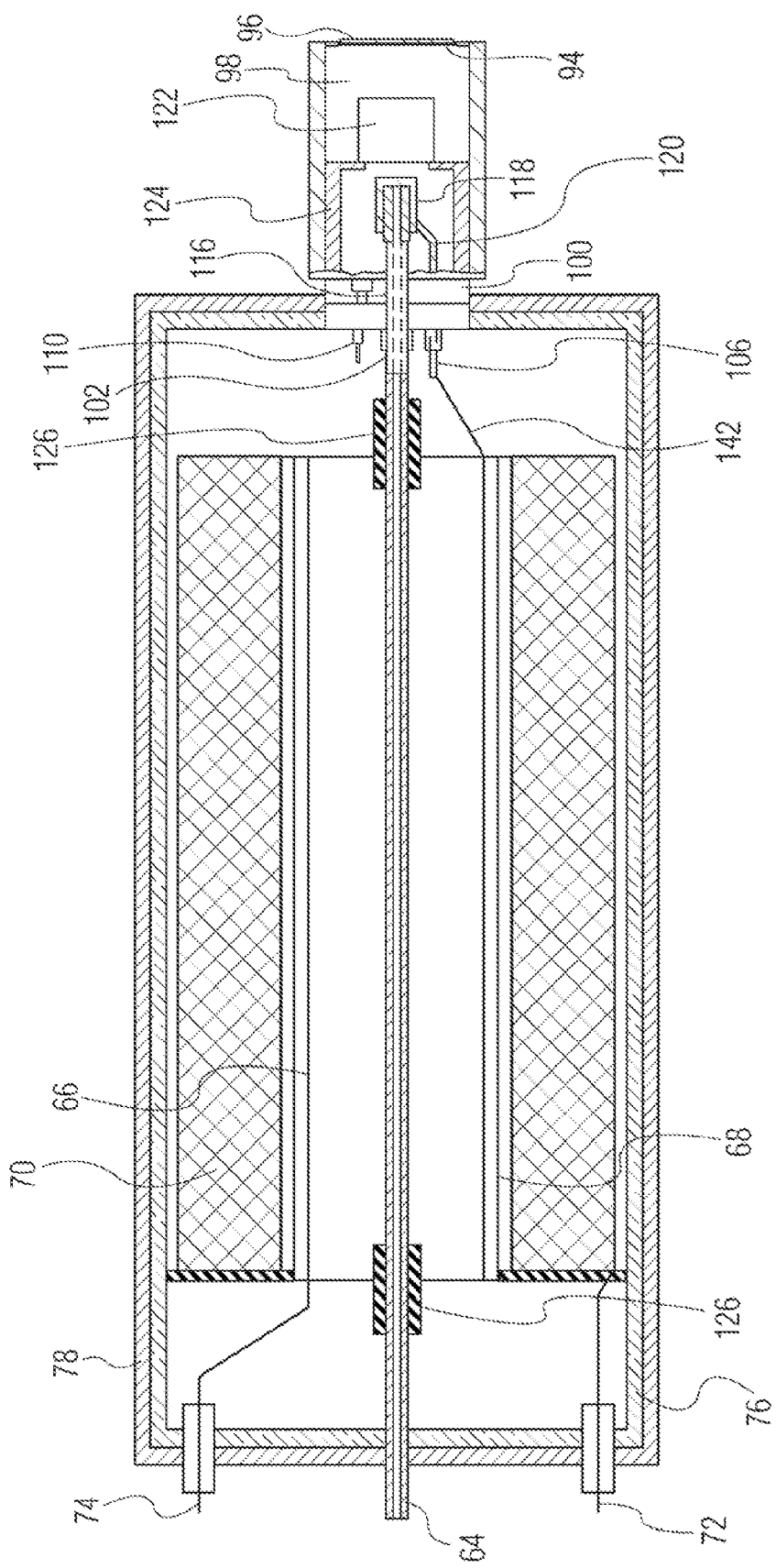
FIG. 12 is a sectional view along the length of a combined SXE-MILO driver.
Figure 13:
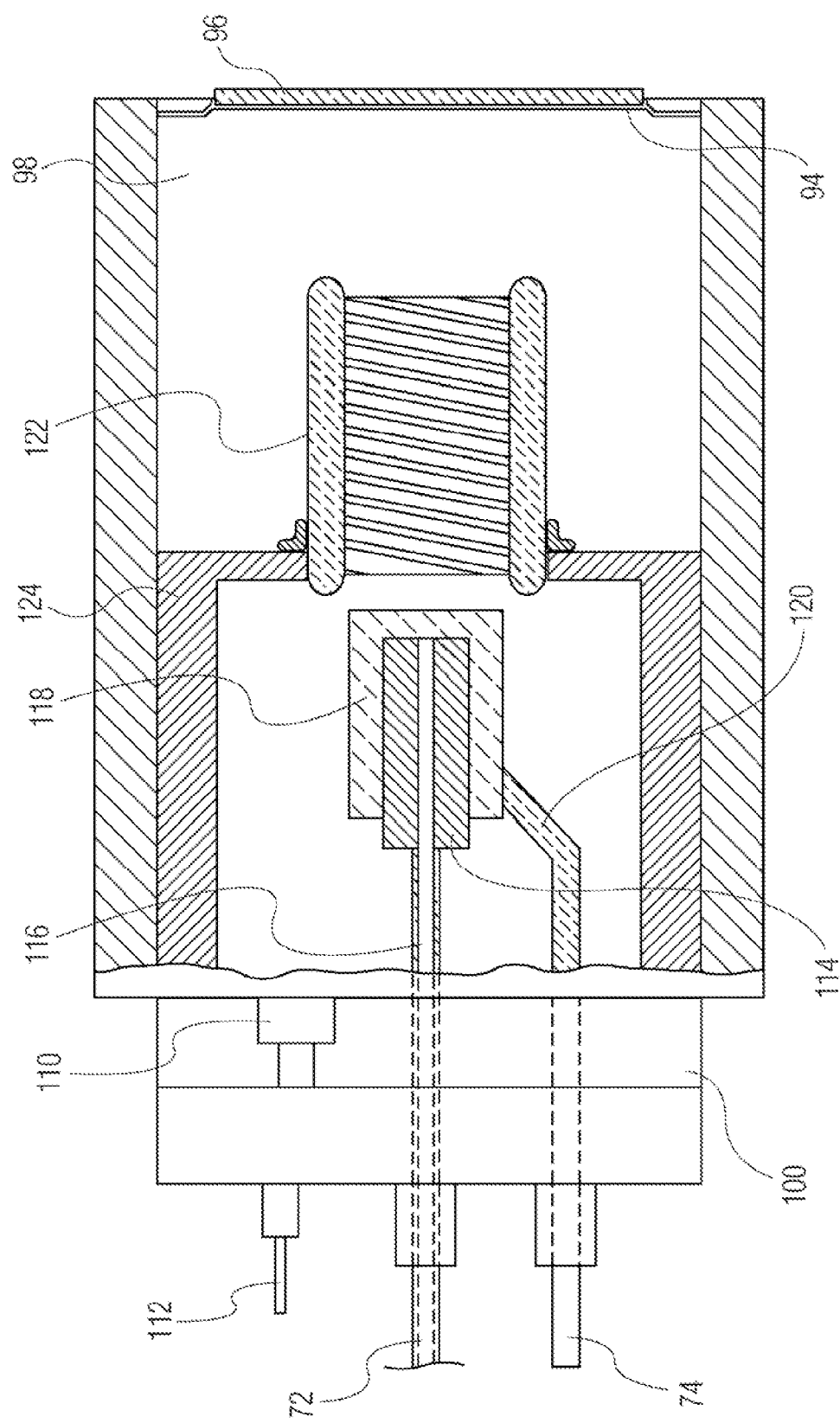
FIG. 13 is a partly sectional view along the length of the MILO RF head of FIG. 12.
Figure 14A:
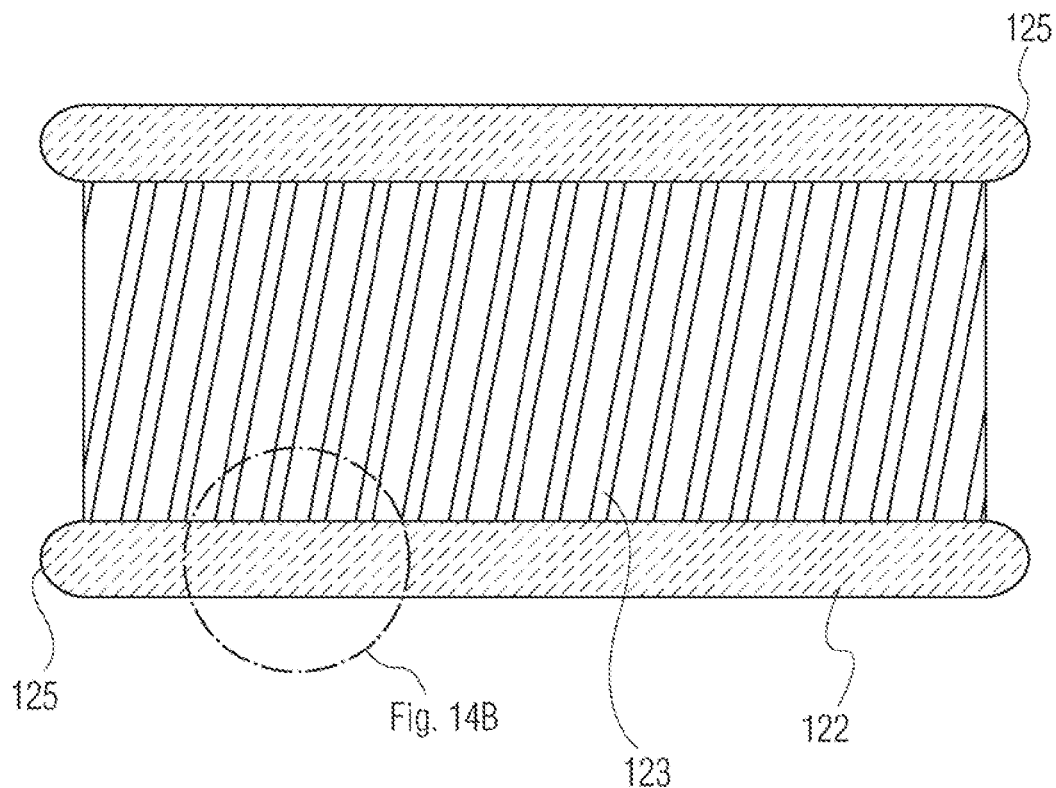
FIG. 14 is a sectional view along the length of a Drift Tube used in the MILO RF head of FIG. 12.
FIG. 14B is an enlarged view of the circled region in FIG. 14A entitled "FIG. 14".
Figure 14B:
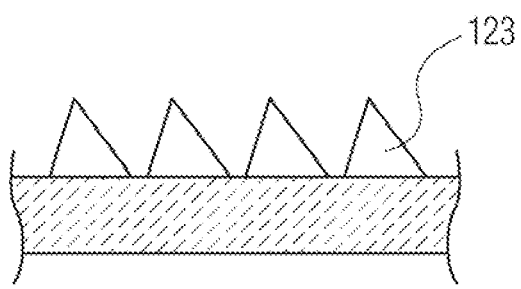

FIG. 12 shows a cross-section of an SXE combined with a Magnetically Insulated Linear Oscillator (MO) at the output (right-shown) end of the SXE. The MILD is another well known, high power RF source, similar to the Vircator. The significant difference is that it can produce much higher frequencies than the Vircator. Structurally, the major difference is the incorporation of a drift tube 122 of FIG. 14A and use of a Traveling Wave Electron Gun (TWEG) instead of the planar cathode 90 and grid 92 of the Vircatron. There is a resonant cavity 98 and its dimensions in conjunction with the dimensions of the drift tube 122 (FIG. 14A) determine the output range. Conventional MILD devices have outputs between 300 MHz and 3.5 GHz. The inventor of the present invention has experimentally verified that by placing a grating surface on the inner face of the drift tube 122 (FIG. 14A), as shown FIG. 14B, it is possible to generate RF at much higher frequencies than those available from a smooth bore drift tube 122. The source of this RF is due to the Smith-Purcell effect which describes the interaction of a relativistic electron beam with a grating surface 123. Outputs in the THz range are possible. The grating surface can be formed by many methods. The spacing, face angle and grating geometry all are determinants in the frequency achieved (FIG. 14B). It has been determined that the preferred embodiment of the drift tube grating is an internal thread as shown in FIGS. 14A and 14B. By altering the thread parameters, the output frequency is changed. The ends of the Drift Tube 125 are radiused to minimize formation of undesirable electric field perturbations inside the Resonant Cavity 98.

The balance of the SXE-MILO driver is the same as the SXE-Vircator. In fact, the RF heads—Vircator and MILO—can be interchanged. As in the case of the SXE-Vircator, the TWEG of the MILO has a hollow center through which the x-rays pass. The electron output from the TWEG is compressed by the drift tube 122 and oscillates in the resonant cavity 98.

Fusion Power System Efficiency

The SXE-based fusion power generation system has a substantially higher efficiency than all other fusion power generation systems. This is due to two factors:
 (1) Direct x-ray drive is inherently more efficient than any indirect method.
 (2) Multiple Means of Energy Extraction.

Let us consider what the basic efficiency determinants of the fusion process are. We will first consider the amount of energy required to initiate a fusion reaction.

Let:
 W=Power input to drivers, (NIF=400 TeraWatts; SXE=50 MegaWatts)
 X=Energy required to generate x-rays (NIF=1.5 MegaJoules, SXE=50 KiloJoules)
 Y=Amount of x-ray required to drive the reaction (25 KiloJoules; either case)
 Z=Total energy output of the fusion, (1000 times the input energy; either case)
 T=Reaction Burn Time (5 Hertz repetition rate 200 milliseconds; either case)

We can now make the following statements: X>Y, and for a system to be practical, Z>>X In the case of NIF, X=1.5 MegaJoules, and Y=25 KiloJoules (for a D-T reaction). According to researchers at NIF, a complete burn of the fuel pellet will produce "somewhere between 600 and 1000 times the amount of energy that is put into it [the target]" (Haan Reference). Dr Haan does not tell us whether he means the laser power input or the x-ray input. If he is referring to the laser power input of 1.5 MegaJoules, this would argue for an output of 1.5 GigaJoules. If he is referring to the x-ray input, then 25 KiloJoules input would yield 25 MegaJoules output.

The NIF baseline design calls for a pellet injection rate of 5 pellets per second, so it is reasonable to presume that the useful life of the plasma is 200 milliseconds.

The NIF system requires around 400 TeraWatts of power ($4 \times 10^{12}$ Watts) to accomplish this. If we use the actual x-ray input of 25 KiloJoules, and an output of 25 MegaJoules, the output value times the burn time equals 5 MegaWatts. A system that consumes 400 TeraWatts to produce 5 MegaWatts has an efficiency of 0.00015%. If we were to use the input power to the laser as a multiplier instead of the x-ray input power, the output would only be around 250 GigaWatts. In either case, when compared to the massive input power requirement (400 TeraWatts), it is clear that NW is only a step in the process, not a system that should achieve breakeven conditions.

Let us now consider an SXE based system using the same D-T reaction and fuel pellet as the above analysis of NW. We have previously shown that the D-T fusion reaction produces $2.5 \times 10^8$ watts (250 GigaWatts) per pellet for a period of 200 milliseconds. The SXE driver system will consume 25 MegaJoules which, for the 200 milliseconds time period works out to $(2.5 \times 10^8) \times (2 \times 10^{-1}) = 5 \times 10^7$ Watts or 500 MegaWatts. A system that consumes 500 MegaWatts to produce the same 250 GigaWatts has an efficiency of 500% (output/input=efficiency). We now take the Rankine cycle loss into account and come up with an efficiency of 250%.

The foregoing calculation does not take into account one of the most important characteristics of a preferred embodiment of the current invention: The simultaneous use of direct extraction of high voltage DC to run the SXE drivers, which run on high voltage DC. The direct extraction process has a verified efficiency of approximately 85%. This means that 15% of 500 MegaWatts (75 MegaWatts) is drawn from the thermal output leaving over 249 GigaWatts available for output to a power grid. This feature makes the use of SXE systems for maritime applications a practical as the dimension of the system are small enough to allow its incorporation on any ship with a beam of 100 feet (30.5 meters) or more. This analysis also shows that the baseline design system described in this application is more than capable of exceeding breakeven conditions.

Alternate Energy Driver

The current invention is not limited to the use of the SXE and its derivatives as the x-ray source for providing energy to initiate the fusion reaction. There is a prior art device known as a Plasma Focus device. This is an electron tube with a different structure from the SXE. It is capable of producing intense x-ray bursts at the energy levels required for Direct Drive Fusion Applications. It has several disadvantageous attributes which make it less desirable than the SXE for use as a fusion driver.

The Plasma Focus does not produce a collimated beam of x-rays as the SXE does. This is not desirable as there is a need to focus the energy on the target. The SXE produces a collimated beam of the correct diameter. The Plasma Focus requires an off-axis reflector that is curved in 2 dimensions. This reflector can be used to collimate the beam or bring it to a focus on the target pellet. The beam quality is such that it would be necessary to use the Apodizing Filter of a preferred embodiment of this invention to correct the wavefront to a useful shape.

The Plasma Focus does not generate a simultaneous High Voltage DC output pulse as the SXE does. This is a disadvantage as it means that external heating or compression technologies will require a separate power supply and will lower the overall efficiency of the fusion reactor significantly. (Gai Reference.)

DRAWING REFERENCE NUMBERS

The following list of drawing reference numbers has three columns. The first column includes drawing reference numbers; the second column specifies the parts associated with the reference numbers; and the third column mentions a preferred material (if applicable) for the parts.

| REFERENCE NUMBER LIST | PREFERRED MATERIAL |
|---|---|
| 10 Target Chamber | Stainless Steel |
| 12 SXE X-ray Driver (6 places) | Various |
| 14 Energy Extraction Cones (6 places) | Various |
| 16 Target Pellet Injector | Various |
| 18 Thermal Coolant Inlet | Stainless Steel |
| 20 Thermal Coolant Outlet | Stainless Steel |
| 22 Target Pellet Location | n/a |
| 24 Coolant Passage Layer | n/a |
| 28 Liner | Refractory Metal |
| 30 Magnetic Confinement Coils | Copper |
| 32 Magnetic Confinement Drive | n/a |
| 34 Pulse Modulator | Electronics |
| 36 HV DC to SXE Driver | Electronics |
| 38 Energy Store & Power Conditioning | Electronics |
| 40 Startup & Makeup Power | Electronics |
| 42 Electron Coupled Transformer | Various |
| 44 HV DC Power Supply | Electronics |
| 46 DC Extractor Grid | Refractory Metal |
| 48 HV DC recycles to Energy Store | n/a |
| 56 Plane Wave | X-ray |
| 58 Apodizing Filter | Various Low-Z Materials |
| 60 Corrected Wavefront | X-ray |
| 62 Collapsing Traveling Wave | Electrons |
| 64 Anode | Refractory Metal; Hi-Z |
| 66 Grid | Refractory Metal |
| 68 Cathode | Graphite (Preferred Embodiment) |
| 70 Coaxial Capacitor | Dielectric/Metal Layers |
| 72 Cathode Feedthrough | Ceramic & Metal |
| 74 Grid Feedthrough | Ceramic & Metal |
| 76 Glass Vacuum Envelope | Glass (Ceramic, Stainless Steel) |
| 78 Radiation Shield | Lead |
| 80 Anode Output Insulator | Ceramic |
| 84 ECT Input Waveform | n/a |
| 86 ECT Output Waveform | n/a |
| 90 Vircator Cathode | Graphite |
| 92 Vircator Grid | Refractory Metal |
| 93 Aperture in Vircator Cathode | n/a |
| 94 Anode Mesh | Refractory Metal |
| 96 Output Window | RF Transparent Low-Z Ceramic |
| 98 Resonant Circular Cavity | Stainless Steel or Copper |
| 100 Mounting Flange | Stainless Steel |
| 102 Cathode Feedthrough | Ceramic & Metal |
| 104 Cathode Support | Refractory Metal |
| 106 Grid Feedthrough | Ceramic & Metal |
| 108 Grid Support | Refractory Metal |
| 110 Getter Pump | n/a |
| 112 Getter Pump Feedthrough | Ceramic & Metal |
| 114 MILO Cathode | Graphite |
| 116 MILO Cathode Support | Refractory Metal |
| 118 MILO Grid | Refractory Metal |
| 120 MILO Grid support | refractory Metal |
| 122 Drift Tube | Refractory Metal |
| 124 Drift Tube Support | Ceramic |
| 125 Radiused end of Drift Tube | Refractory Material |
| 126 Internal Anode Insulator | Ceramic |
| 128 Grid insulator | Ceramic |
| 130 Upper Grid Support Ring | Stainless Steel |
| 132 Lower Grid Support Ring | Stainless Steel |
| 134 Phase Matching Network Wire | Stainless Steel |
| 136 Phase Matching Network Connector | Stainless Steel |
| 138 Internal Anode Insulator | Ceramic |
| 140 Phase Matching Network End Insulator | Ceramic |
| 142 Grid Output Terminal | Refractory Metal |
| 144 Wire to Grid Feedthrough | Ceramic & Metal |
| 146 Grid Tension Spring | Stainless Steel |
| 148 Washer | Stainless Steel |
| 150 Hex Nut | Stainless Steel |
| 152 Phase Matching Network Insulator | Ceramic |

LITERATURE REFERENCE CITATIONS

The following literature references are cited in short form in the specification. For instance, the short literature reference for author "Nakai" is given as follows: (Nakai Reference.)

"On Target Designing for Ignition", Steven Haan, Lawrence Livermore, Science & Technology Review, July/August, 1999

"The Physics Issues That Determine Inertial Confinement Fusion Target Gain and Driver Requirements; A Tutorial", Mordecai D. Rosen, Lawrence Livermore National Laboratory, Livermore, Calif. 94550 12 Nov. 1998, Physics of Plasmas, Vol. 6, No. 5.

"Convergent Hydrodynamics of Inertial Confinement Fusion Implosions", C. W. Barnes, LLNL Physics Division 132 Progress Report 1997-1998

"Fundamental Experiments on Hydrodynamic Instability in Direct Drive Laser Fusion at Gekko XII", M. Nakai, Institute of Laser Engineering, University of Osaka, Japan.

"Production of Fast Neutron with a Plasma Focus Device", Moshe Gai, Laboratory for Nuclear Science at Avery Point, University of Connecticut, 5 May 2006

The foregoing describes fusion power systems in which both high voltage DC energy and thermal energy are extracted. In one embodiment, the extracted high voltage DC energy can be used as an energy source to sustain controlled fusion reactions. High hydrodynamic stability in focusing driving energy onto a target fuel pellet can be realized with the use of an Apodizing filter to shape the driving energy wavefronts that reach a fuel pellet.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

The invention claimed is:

1. A system for applying synchronous x-ray pulses to inertial confinement fusion target material, comprising:
   a) a central target chamber for receiving fusion target material in the form of a fusion target pellet in spherical form; wherein the target chamber is bound by a chamber wall;
   b) a plurality of energy drivers arranged around the exterior of the target chamber in symmetrical pairs about said fusion target pellet and arranged in a 3-dimensionally symmetric, direct drive configuration about said fusion target pellet;
   c) means for controlling the plurality of energy drivers to:
      generate x-ray pulses exterior of the chamber wall,
      emit the generated x-ray pulses into the target chamber, and
      apply the emitted x-ray pulses as combined synchronous x-ray pulses directly into the fusion target pellet in the target chamber,
         wherein each of the synchronous x-ray pulses includes one x-ray pulse from each of the energy drivers; and
   d) a plurality of means for extracting fusion reaction energy released from the fusion target pellet, comprising both:
      i) means to extract high voltage DC energy from fusion plasma involving the fusion target pellet; and
      ii) means to extract thermal energy from the target chamber;

e) each of the plurality of energy drivers comprising an x-ray source, wherein each x-ray source comprises:
   i) a cylindrical triode electron tube,
      wherein each electron tube includes a hollow central anode along a center axis of the tube,
      wherein each electron tube includes a grid and a cathode radially spaced from the anode;
   ii) wherein the cathode and the grid form a circular waveguide electron gun that produces a wave of ground potential in Transverse Electric Mode when the grid is grounded,
      which wave propagates along a linear axis of the electron gun at the speed of light;
      the cathode and the grid being configured to cause a radially symmetrical collapsing travelling wave of electrons to be formed when the grid is grounded; said wave of electrons propagating along the linear axis of the electron gun,
         sweeping along the anode at the speed of light, and having energy capable of causing electrons to penetrate a wall of the anode and cause a zone of Bremsstrahlung and electrons,
         wherein said zone is swept as a wavefront along an inner hollow space of the anode at the speed of light;
   iii) wherein the inner hollow space is filled with a lasing medium which is fully ionized by the swept zone; and
   iv) wherein the energy of the swept zone is pumped in a linear fashion by at least energy contained in distributed interelectrode capacitance of the cathode and the grid.

2. The system of claim 1, wherein each of the plurality of energy drivers comprises a unitary apparatus that produces both:
   an x-ray pulse for causing the release of fusion reaction energy from the target material; and
   RF energy to heat the fusion target material.

3. The system of claim 1, further comprising:
   an apodizing structure associated with each of the plurality of energy drivers for reshaping the wavefront of the x-ray pulse to be concave from the perspective of the fusion target material;
   the apodizing structure defined by either one of:
      an apodizing filter comprising a solid object of varying thickness along the direction of the x-ray pulse; the thickness of the apodizing filter being greater near the center of the wavefront of the x-ray pulse than near the edges of said wavefront; or
      a diffractive optical component.

4. The system of claim 2, further comprising:
   an apodizing structure associated with each of the plurality of energy drivers for reshaping the wavefront of the x-ray pulse to be concave from the perspective of the fusion target material;
   the anodizing structure defined by either one of:
      an anodizing filter comprising a solid object of varying thickness along the direction of the x-ray pulse; the thickness of the anodizing filter being greater near the center of the wavefront of the x-ray pulse than near the edges of said wavefront; or
      a diffractive optical component.

5. The system of claim 1, 2 or 3, wherein said plurality of energy drivers are powered by an energy storage means; said energy storage means receiving power from:
   a first power supply providing start-up and make-up power; and
   a second power supply deriving energy from high voltage DC energy extracted from said fusion reaction energy;
      wherein said start-up power is the total energy required for initiating the release of fusion reaction energy and the make-up power is the energy that is added to the energy from the second power supply to maintain the release of fusion reaction energy.

6. The system of claim 1, wherein each of the plurality of energy drivers uses x-ray source gas of any one of, or combination of Oxygen, Nitrogen, Neon, Argon, Krypton, Radon, Bismuth, Mercury and Uranium.

7. The system of claim 1, 2 or 3, wherein each of the plurality of energy drivers has an x-ray drive energy between about 200 electron Volts and 100 KiloElectron Volts.

8. The system of claim 1, 2 or 3, wherein each of the plurality of energy drivers uses a lasing medium of any one of, or combination of, any element with an atomic number between 7 and 93.

9. The system of claim 1, further comprising a coaxial capacitor concentrically wound on the external surface of the cathode.

10. The system of claim 1, wherein:
   the x-ray source also produces a high voltage pulse at the output end of the anode; and
   said high voltage pulse is used to produce an RF heating pulse for heating the fusion target material by RF generation means comprising a resonant cavity and electron gun being attached to the output end of the anode of the x-ray source so as to produce a phase coherent burst of RF energy coincident with the x-ray pulse.

11. The system of claim 5, wherein said first power supply uses an Electron-Coupled Transformer to generate a high voltage pulse compatible with, and added to, the power generated by said second power supply.

12. The system of claim 10, wherein RF generation means of each of the plurality of energy drivers comprises a Virtual Cathode Oscillator with a central aperture in the cathode of the electron gun, the central aperture allowing an x-ray pulse to pass through the cathode of the electron gun of the Virtual Cathode Oscillator.

13. The system of claim 10, wherein RF generation means of each of the plurality of energy drivers incorporates a cylindrical drift tube forming a Magnetically Insulated Linear Oscillator with a central aperture in the cathode of the electron gun which allows an x-ray pulse to pass through the cathode of the electron gun of the Magnetically insulated Linear Oscillator.

14. The system of claim 12 or 13, wherein the RF generation means is automatically sequentially triggered after the onset of the x-ray pulse by internal interconnective elements of the energy driver.

15. The system of claim 12, wherein:
   the drift tube has a periodic grating geometry on the inner surface of said tube;
   spacing, face angle, and geometry of the grating and the energy of an incident electron beam are determinants of the RF output frequency spectrum of the Magnetically Insulated Linear Oscillator; and
   the energy of the incident electron beam is greater than 100,000 electron Volts.

16. The system of claim 3, wherein the apodizing structure is defined by an apodizing filter comprising a solid object of varying thickness along the direction of the x-ray pulse; the thickness of the apodizing filter being greater near the center of the wavefront of the x-ray pulse than near the edges of said wavefront.

17. The system of claim 1, wherein the target chamber contains pulsed magnetic confinement coils for keeping the plasma from contacting an innermost-facing surface of an innermost-facing structure in the target chamber, said coils being responsive to an output of a pulse modulator synchronized with an output of a pulse modulator supplying high voltage DC power to said plurality of energy drivers.

18. The system of claim 2, wherein all of said energy drivers are located external to the target chamber.

19. A method for applying synchronous X-ray pulses to inertial confinement fusion target material, comprising:
   a) providing a central target chamber for receiving fusion target material in the form of a fusion target pellet in spherical form;
      wherein the target chamber is bound by a chamber wall;
   b) arranging a plurality of energy drivers around the exterior of the target chamber in symmetrical pairs about said fusion target pellet and in a 3-dimensionally symmetric, direct drive configuration about said fusion target pellet;
   c) controlling the plurality of energy drivers so that they:
      generate x-ray pulses exterior of the chamber wall,
      emit the generated x-ray pulses into the target chamber, and
      apply the emitted x-ray pulses as combined synchronous x-ray pulses directly in the fusion target pellet in the target chamber,
         wherein each of the synchronous x-ray pulses includes one x-ray pulse from each of the energy drivers; and
   d) providing a plurality of means for extracting fusion reaction energy released from the fusion target pellet, comprising both:
      i) providing means to extract high voltage DC energy from fusion plasma involving the fusion target pellet; and
      ii) providing means to extract thermal energy from the target chamber,
   e) wherein each of the plurality of energy drivers comprises an x-ray source, wherein each x-ray source comprises:
      i) a cylindrical triode electron tube,
         wherein each electron tube includes a hollow central anode along a center axis of the tube,
         wherein each electron tube includes a grid and a cathode radially spaced from the anode;
      ii) wherein the cathode and the grid form a circular waveguide electron gun that produces a wave of ground potential in Transverse Electric Mode when the grid is grounded,
         which wave propagates along a linear axis of the electron gun at the speed of light;
         the cathode and the grid being configured to cause a radially symmetrical collapsing travelling wave of electrons to be formed when the grid is grounded;
         said wave of electrons propagating along the linear axis of the electron gun,
         sweeping along the anode at the speed of light, and having energy capable of causing electrons to penetrate as wall of the anode and cause a zone of Bremsstrahlung and electrons,
         wherein said zone is swept as a wavefront along an inner hollow space of the anode at the speed of light;
      iii) wherein the inner hollow space is filled with a lasing medium which is fully ionized by the swept zone; and
      iv) wherein the energy of the swept zone is pumped in a linear fashion by at least energy contained in distributed interelectrode capacitance of the cathode and the grid.

20. The method of claim 19, further comprising, reshaping the wavefront of the x-ray pulse to be concave from the perspective of the fusion target material by means of an apodizing structure defined as either one of a diffractive optical component or an apodizing filter comprising a solid object of varying thickness along the direction of the x-ray pulse; the thickness of the apodizing filter being greater near the center of the wavefront of the x-ray pulse than near the edges of said wavefront.

21. The method of claim 20, wherein the reshaping the wavefront of the x-ray pulse to be concave from the perspective of the fusion target material is by means of an apodizing structure defined as an apodizing filter comprising a solid object of varying thickness along the direction of the x-ray pulse; the thickness of the apodizing filter being greater near the center of the wavefront of the x-ray pulse than near the edges of said wavefront.

* * * * *

UNITED STATES PATENT AND TRADEMARK OFFICE
CERTIFICATE OF CORRECTION

PATENT NO. : 9,036,765 B2
APPLICATION NO. : 11/754928
DATED : May 19, 2015
INVENTOR(S) : Birnbach Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 768 days.

Signed and Sealed this
Thirteenth Day of October, 2015

Michelle K. Lee
*Director of the United States Patent and Trademark Office*